US012546738B2

(12) United States Patent
Jelinek et al.

(10) Patent No.: US 12,546,738 B2
(45) Date of Patent: Feb. 10, 2026

(54) DEVICE AND METHODS FOR DETECTING PATHOGENS

(71) Applicant: B. G. NEGEV TECHNOLOGIES AND APPLICATIONS LTD., AT BEN-GURION UNIVERSITY, Beer Sheva (IL)

(72) Inventors: Raz Jelinek, Reut (IL); Nitzan Shauloff, Beer Sheva (IL)

(73) Assignee: B. G. NEGEV TECHNOLOGIES AND APPLICATIONS LTD., AT BEN-GURION UNIVERSITY, Beer Sheva (IL)

(*) Notice: Subject to any disclaimer, the term of this patent is extended or adjusted under 35 U.S.C. 154(b) by 285 days.

(21) Appl. No.: 18/196,072

(22) Filed: May 11, 2023

(65) Prior Publication Data
US 2023/0280297 A1    Sep. 7, 2023

Related U.S. Application Data

(63) Continuation of application No. PCT/IL2021/051347, filed on Nov. 11, 2021.
(Continued)

(51) Int. Cl.
*G01N 27/22* (2006.01)
*B01L 3/00* (2006.01)
(Continued)

(52) U.S. Cl.
CPC ...... *G01N 27/227* (2013.01); *B01L 3/502715* (2013.01); *G01N 27/226* (2013.01);
(Continued)

(58) Field of Classification Search
CPC .............. G01N 27/227; G01N 27/226; G01N 33/0027; G01N 33/487; G01N 33/4977;
(Continued)

(56) References Cited

U.S. PATENT DOCUMENTS

2004/0022677 A1*  2/2004  Wohlstadter ......... G01N 21/253
                                          422/52
2013/0186177 A1*  7/2013  Palazzotto ........... G01N 27/227
                                          73/31.05
(Continued)

FOREIGN PATENT DOCUMENTS

| JP | 2020-514760 A | 5/2020 |
| WO | 2014042660 A1 | 3/2014 |
| WO | 2020/102880 | 5/2020 |

OTHER PUBLICATIONS

Carey JR, Suslick KS, Hulkower KI, Imlay JA, Imlay KR, Ingison CK, Ponder JB, Sen A, Wittrig AE. Rapid identification of bacteria with a disposable colorimetric sensing array. J Am Chem Soc. May 18, 2011;133(19):7571-6. doi: 10.1021/ja201634d. Epub Apr. 27, 2011. PMID: 21524080; PMCID: PMC3097425.
(Continued)

*Primary Examiner* — Benjamin R Schmitt
(74) *Attorney, Agent, or Firm* — The Roy Gross Law Firm, LLC; Roy D. Gross

(57) ABSTRACT

The present invention is directed to a sensing device including a plurality of capacitive sensors, each capacitive sensor comprises a sensing element electrically connected to electrodes and comprising carbon dots; the plurality of capacitive sensors comprises at least a first sensor, a second sensor and a third sensor; the carbon dots of the first sensor, the second sensor and the third sensor independently comprise hydrophilic surface groups, each independently comprising nitrogen and oxygen atoms; the hydrophilic surface groups of the carbon dots predetermine: (i) a different surface polarity; and (ii) a different sensitivity of the first sensor of the second sensor and of the third sensor to a volatile compound (VC). Further provided is a method of using the sensing device of the invention, such as for determining the
(Continued)

presence of a microorganism of interest in a sample or at a target location.

18 Claims, 19 Drawing Sheets

Related U.S. Application Data

(60) Provisional application No. 63/112,260, filed on Nov. 11, 2020.

(51) Int. Cl.
    *G01N 33/00*       (2006.01)
    *G01N 33/487*    (2006.01)
    *G01N 33/497*    (2006.01)
    *G06N 20/00*     (2019.01)

(52) U.S. Cl.
    CPC ....... *G01N 33/0027* (2013.01); *G01N 33/487* (2013.01); *G01N 33/4977* (2024.05); *G06N 20/00* (2019.01); *B01L 2300/0645* (2013.01); *B01L 2300/0819* (2013.01); *B01L 2300/161* (2013.01); *G01N 2027/222* (2013.01)

(58) Field of Classification Search
    CPC ......... G01N 2027/222; B01L 3/502715; B01L 2300/0645; B01L 2300/0819; B01L 2300/161
    See application file for complete search history.

(56) References Cited

U.S. PATENT DOCUMENTS

| | | |
|---|---|---|
| 2015/0068900 A1 | 3/2015 | Salzer et al. |
| 2018/0292338 A1 | 10/2018 | Liu et al. |
| 2019/0204265 A1 | 7/2019 | Stowell et al. |
| 2019/0271685 A1 | 9/2019 | Haick et al. |

OTHER PUBLICATIONS

Shauloff N, Morag A, Yaniv K, Singh S, Malishev R, Paz-Tal O, Rokach L, Jelinek R. Sniffing Bacteria with a Carbon-Dot Artificial Nose. Nanomicro Lett. Apr. 20, 2021;13(1):112. doi: 10.1007/s40820-021-00610-w. PMID: 34138310; PMCID: PMC8058130.
Thongsai N, Tanawannapong N, Praneerad J, Kladsomboon S, Jaiyong P, Paoprasert P, Real-time detection of alcohol vapors and volatile organic compounds via optical electronic nose using carbon dots prepared from rice husk and density functional theory calculation, Colloids and Surfaces A: Physicochemical and Engineering Aspects (2018), https://doi.org/10.1016/j.colsurfa.2018.09.077.
Ding, H., Yu, S.- B., Wei, J.-S., & Xiong, H.-M. (2015). Full-Color Light-Emitting Carbon Dots with a Surface-State-Controlled Luminescence Mechanism. ACS Nano, 10(1), 484-491. doi: 10.1021/acsnano.5b05406.
Zhu Y, Zhao Y, Ma J, Cheng X, Xie J, Xu P, Liu H, Liu H, Zhang H, Wu M, Elzatahry AA, Alghamdi A, Deng Y, Zhao D. Mesoporous Tungsten Oxides with Crystalline Framework for Highly Sensitive and Selective Detection of Foodborne Pathogens. J Am Chem Soc. Aug. 2, 2017; 139(30): 10365-10373. doi: 10.1021/jacs.7b04221. Epub Jul. 18, 2017. PMID: 28683546.
Turner AP, Magan N. Electronic noses and disease diagnostics. Nat Rev Microbiol. Feb. 2004;2(2): 161-6. doi: 10.1038/nrmicro823. PMID: 15040263.
Bonah E, Huang X, Aheto JH, Osae R. Application of electronic nose as a non-invasive technique for odor fingerprinting and detection of bacterial foodborne pathogens: a review. J Food Sci Technol. Jun. 2020;57(6):1977-1990. doi: 10.1007/s13197-019-04143-4. Epub Nov. 5, 2019. PMID: 32431324; PMCID: PMC7230105.
Park SY, Kim Y, Kim T, Eom TH, Kim SY, Jang HW. Chemoresistive materials for electronic nose: Progress, perspectives, and challenges. InfoMat. 2019; 1: 289-316. https://doi.org/10.1002/inf2.12029.
D. Xu, Q. Lin, H.- T. Chang, Recent Advances and Sensing Applications of Carbon Dots. Small Methods 2020, 4, 1900387. https://doi.org/10.1002/smtd.201900387.
Vedamalai M, Periasamy AP, Wang CW, et al. Carbon nanodots prepared from o-phenylenediamine for sensing of Cu (2+) ions in cells. Nanoscale. Nov. 2014;6(21): 13119-13125. DOI: 10.1039/c4nr03213f. PMID: 25250814.
S. Dolai, S.K. Bhunia, R. Jelinek, Carbon-dot-aerogel sensor for aromatic volatile organic compounds, Sensors and Actuators, B: Chemical. 241 (2017) 607-613. doi:10.1016/j.snb.2016.10.124.
Liu JH, Li Y, He JH, Yuan D, Li RS, Zhen SJ, Li YF, Huang CZ. Polarity-Sensitive Polymer Carbon Dots Prepared at Room-Temperature for Monitoring the Cell Polarity Dynamics during Autophagy. ACS Appl Mater Interfaces. Jan. 29, 2020;12(4):4815-4820. doi: 10.1021/acsami.9b18934. Epub Jan. 14, 2020. PMID: 31898447.
PCT International Search Report for International Application No. PCT/IL2021/051347, mailed May 9, 2022, 5pp.
PCT Written Opinion for International Application No. PCT/IL2021/051347, mailed May 9, 2022, 5pp.
Japanese Office Action for Japanese Patent Application No. 2023-527321, dated May 27, 2025, 10pp.

\* cited by examiner

FIGURE 10A

DEVICE AND METHODS FOR DETECTING PATHOGENS

CROSS-REFERENCE TO RELATED APPLICATIONS

This application is a bypass continuation of PCT Patent Application No. PCT/IL2021/051347 having International filing date of Nov. 11, 2021 titled "DEVICE AND METHODS FOR DETECTING PATHOGENS", which claims the benefit of priority to U.S. Provisional Application No. 63/112,260 filed on Nov. 11, 2020, titled "DEVICE AND METHODS FOR DETECTING BACTERIA", all of which are hereby incorporated by reference in their entirety.

FIELD OF THE INVENTION

The present invention, in some embodiments, relates to devices and methods for monitoring microbial contamination, such as by detecting volatile compounds derived from microbes.

BACKGROUND

Bacteria are known to emit varied volatile molecules, which types and concentrations are strain dependent. Bacterially produced volatile compounds such as alcohols, aldehydes, ketones, and others have been used as microbial biomarkers, and bacterially emitted volatile metabolite mixtures have been employed as distinctive "odor profile" vehicles for bacterial identification. In particular, colorimetric arrays for sensing volatile compounds have been developed, capable of distinguishing among different bacterial strains. Optical and chemo-resistive gas sensing methods have been also utilized for bacterial analysis, exploiting specific biomarkers. The fundamental limitation of these vapor-based bacterial detection schemes is the fact that they cannot be employed for continuous monitoring, since samples need to be collected (usually manually) and analyzed ex situ. This facet precludes broad range of important bacterial sensing applications in healthcare, environmental monitoring, and homeland security.

Among the diverse gas sensing technologies developed, "artificial noses" have attracted significant interest. Artificial noses aim to effectively mimic the functionalities of the physiological organ, specifically its extraordinary selectivity among different vapor molecules and gas mixtures. Reported artificial nose platforms have relied on different physical mechanisms, such as changes of electrical resistance in conductivity sensors, absorption and desorption of heat in calorimetric sensors and changes of electrical conductance in semiconductor field effect transistors.

The C-dot-IDE capacitive artificial nose has been successfully applied for continuous monitoring and discriminating among bacteria, underscoring the sensor availability as a generic platform for.

There is still a great need for devices, and methods for non-invasive bacterial growth detection comprising continuous monitoring and discriminating among different bacteria.

SUMMARY

The present invention, in some embodiments, is directed to an apparatus, a system comprising same, and methods of using same, for determining the presence of an analyte in a location.

The present invention, in some embodiments, is based, in part, on the findings that the apparatus of the invention, e.g., a C-dot-IDE capacitive artificial nose, was successfully employed for continuous, real-time monitoring of bacterial proliferation. Importantly, the distinctive capacitive signals recorded allowed discrimination among different Gram-positive and Gram-negative bacteria. Overall, the new capacitive C-dot-based artificial nose can be readily implemented as a portable vapor sensor, and for continuous non-invasive monitoring and identification of bacterial growth in different applications, including medical diagnosis, food processing, environmental monitoring and others.

The present invention can be employed as a safety measure, e.g., it is required to exclude the possibility that a bacteria is present. Such safety related application may include, water safety, food safety, human health safety (such as in a hospital or an airport), etc.

The present invention can be employed for determination and monitoring of analytes, e.g., microorganisms and/or VOCs secreted therefrom, in a wide range of locations and applications, such as water safety, food safety, hospitals, veterinary, and airports.

In some embodiments, applying the method of the invention is a prerequisite for a decision making, e.g., determining whether and which an analyte is present, and accordingly, an action so as to neutralize the analyte is taken.

In some embodiments, the training stage comprises recording of a capacitance value under a baseline condition. In some embodiments, the baseline condition is referred to or used as a reference value (e.g., blanc measurement or standard measurement). In some embodiments, any capacitance output of a location calculated or determined according to the herein disclosed method is compared to the blanc measurement or standard measurement. In some embodiments, the method comprises receiving a value of capacitance and comparing to the blanc measurement or the standard measurement so as to obtain a relative or absolute capacitance value, e.g., an unknown measurement or analyte.

In some embodiments, the baseline condition is provided under particular relative humidity condition. In some embodiments, the baseline condition comprises a plurality of relative humidity conditions.

In some embodiments, the relative humidity is at least 10%, at least 40%, at least 60%, at least 70%, or at least 90%, or any value and range therebetween. Each possibility represents a separate embodiment of the invention.

In some embodiments, the relative humidity ranges from 10% to 99%.

A person of skill in the art will appreciate that humidity may change capacitance intensity.

In some embodiments, the method is performed under a specific or particular humidity environment.

In some embodiments, the method comprises calibrating a capacitance change induced by the presence of an analyte under a plurality of humidity environments (e.g., for example measuring Ammonia exposure to 13%, 44%, 64%, 77% and 98%, as described hereinbelow), and generation a calibration curve based on different capacitance values obtained.

In some embodiments, the method comprises measuring the relative humidity value in a target location and the capacitance signal in the target location.

According to a first aspect, there is provided an apparatus comprising a plurality of molecular sensors, wherein: each of the plurality of molecular sensors comprises carbon dots in contact with an electrode; each of the plurality of molecular sensors is in operable communication with a control unit; and each of the plurality of molecular sensors is configured for generating a different capacitance signal in response to an analyte.

According to another aspect, there is provided a system comprising the apparatus of the invention and a current source in operable communication with the electrode.

According to another aspect, there is provided a method for determining the presence of an analyte in a target location, comprising the steps: (a) providing the system of the invention, wherein the providing is in close proximity to a location suspected of comprising the analyte; (b) applying voltage to the system, such that the plurality of molecular sensors generates a plurality of capacitance data; and (c) applying the machine learning model to target capacitance data obtained from the target location, thereby determining the presence of the analyte in the target location.

In some embodiments, the plurality of molecular sensors comprises at least 3 molecular sensors.

In some embodiments, the analyte is a gaseous analyte.

In some embodiments, the analyte comprises a volatile organic compound (VOC).

In some embodiments, the VOC is derived from a microorganism.

In some embodiments, the microorganism is selected form the group consisting of: a bacterium, and a fungus.

In some embodiments, the electrode is configured to receive direct current (DC) or alternating (AC).

In some embodiments, the plurality of molecular sensors are in contact with a substrate.

In some embodiments, the each of the carbon dots is characterized by a different polarity.

In some embodiments, each of the carbon dots is characterized by a different water contact angle.

In some embodiments, the different polarity of each of the carbon dots predetermines that each of the molecular sensors is capable of generating a different capacitance signal in response to an analyte.

In some embodiments, the carbon dots comprise poly-p-phenylenediamine.

In some embodiments, the control unit comprises a processor.

In some embodiments, the system is configured for detection of any one of: (a) a predetermined analyte; (b) a predetermined microbial specie; and (c) any combination of (a) and (b).

In some embodiments, the detection is based on the plurality of capacitance signals obtained from the plurality of molecular sensors.

In some embodiments, the analyte comprises a VOC, a microorganism secreting the VOC, or a combination thereof.

In some embodiments, the location is indoor or outdoor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Distinct capacitance changes are recorded upon exposure of the C-dot-IDEs to vapor molecules, depending upon the types of C-dots deposited and gas molecules.

Figure 2A:
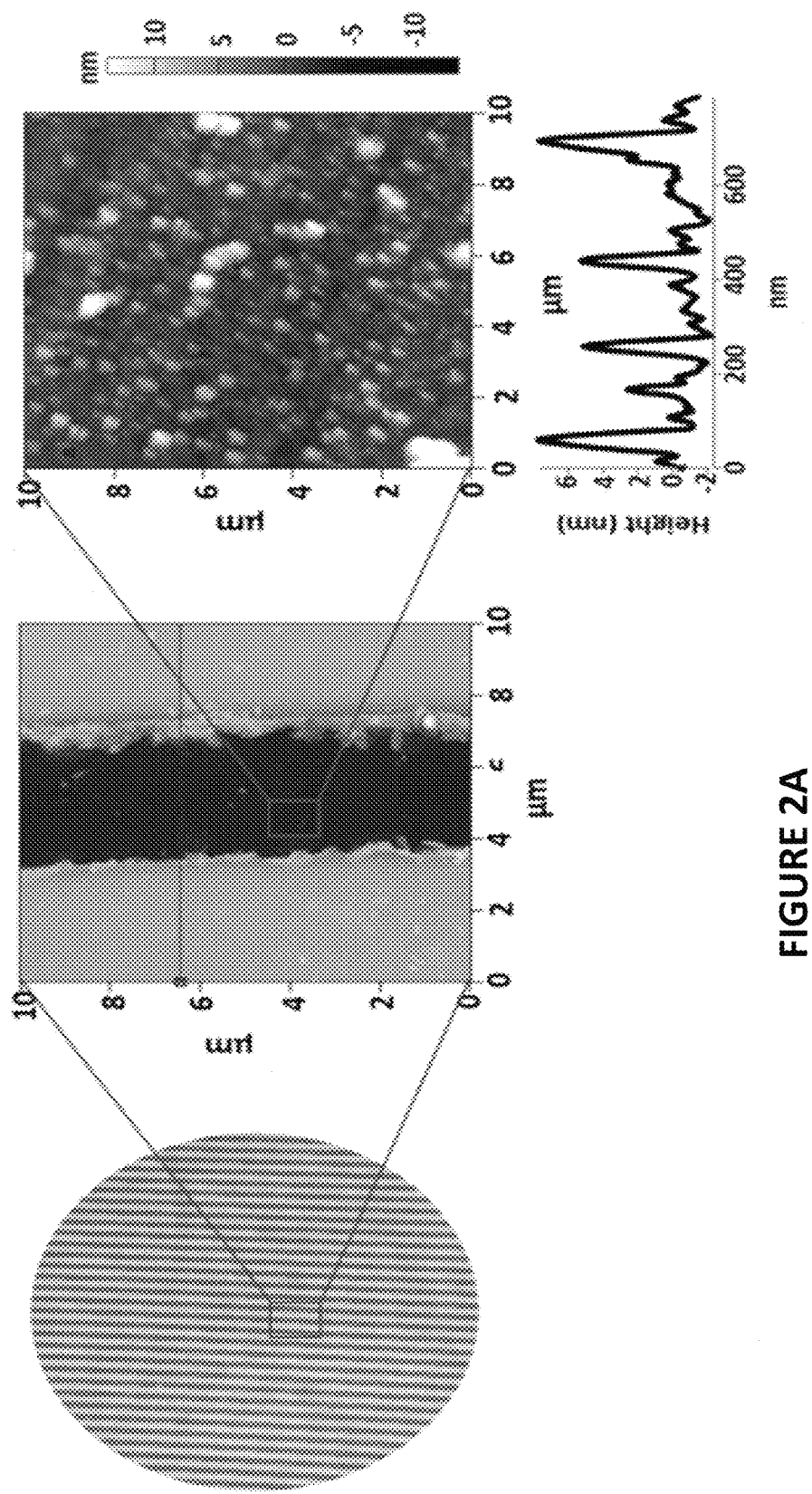
Figure 2B:
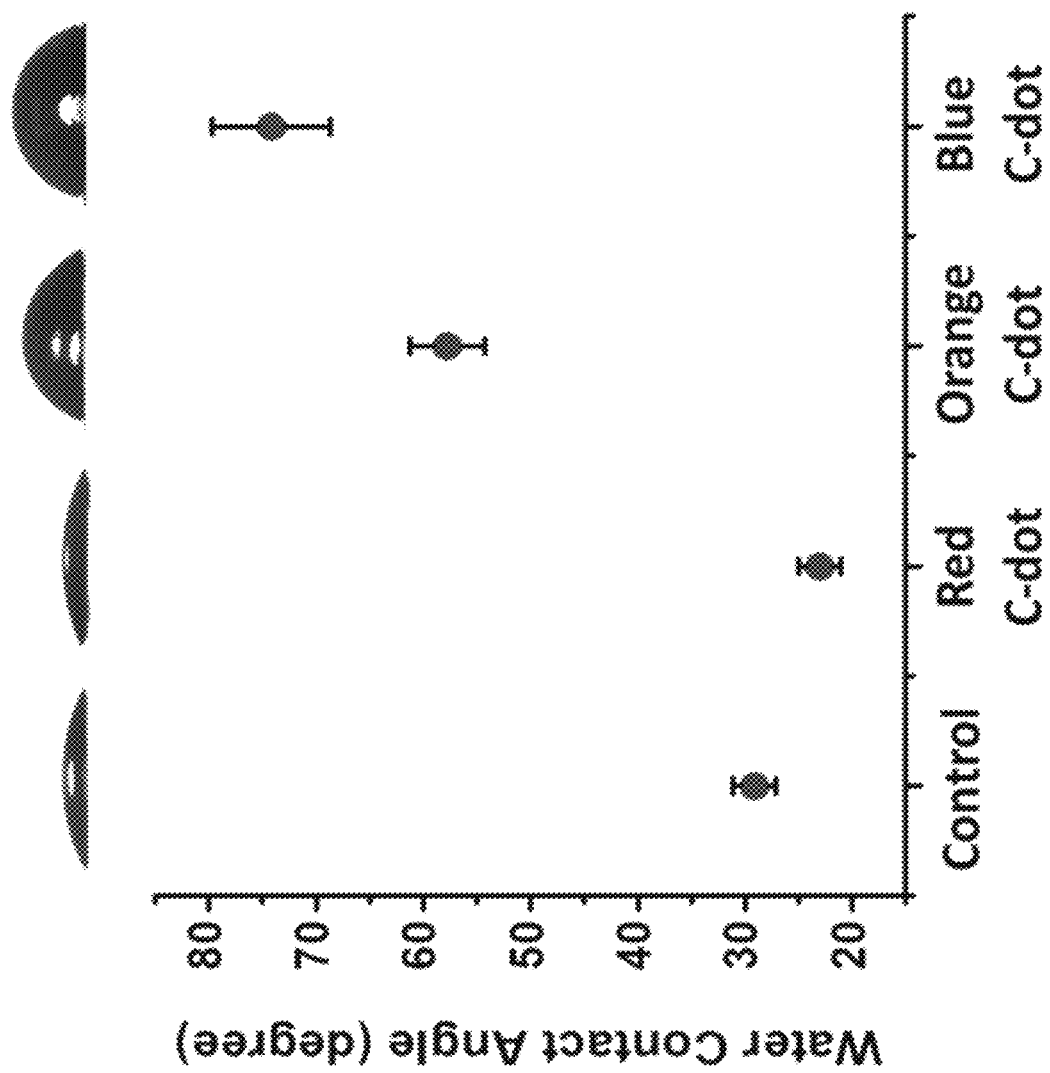

FIG. 2A-2B include micrographs and graphs showing the characterization of the carbon-dot-IDE sensors. (2A) Optical image of the IDE (left) and atomic force microscopy (AFM) images showing ubiquitous C-dots deposited upon the IDE surface between the gold fingers. (2B) Water contact angles (WCA) recorded for the three C-dot-IDEs. The control sample corresponds to an IDE without deposited C-dots.

Figure 3A:
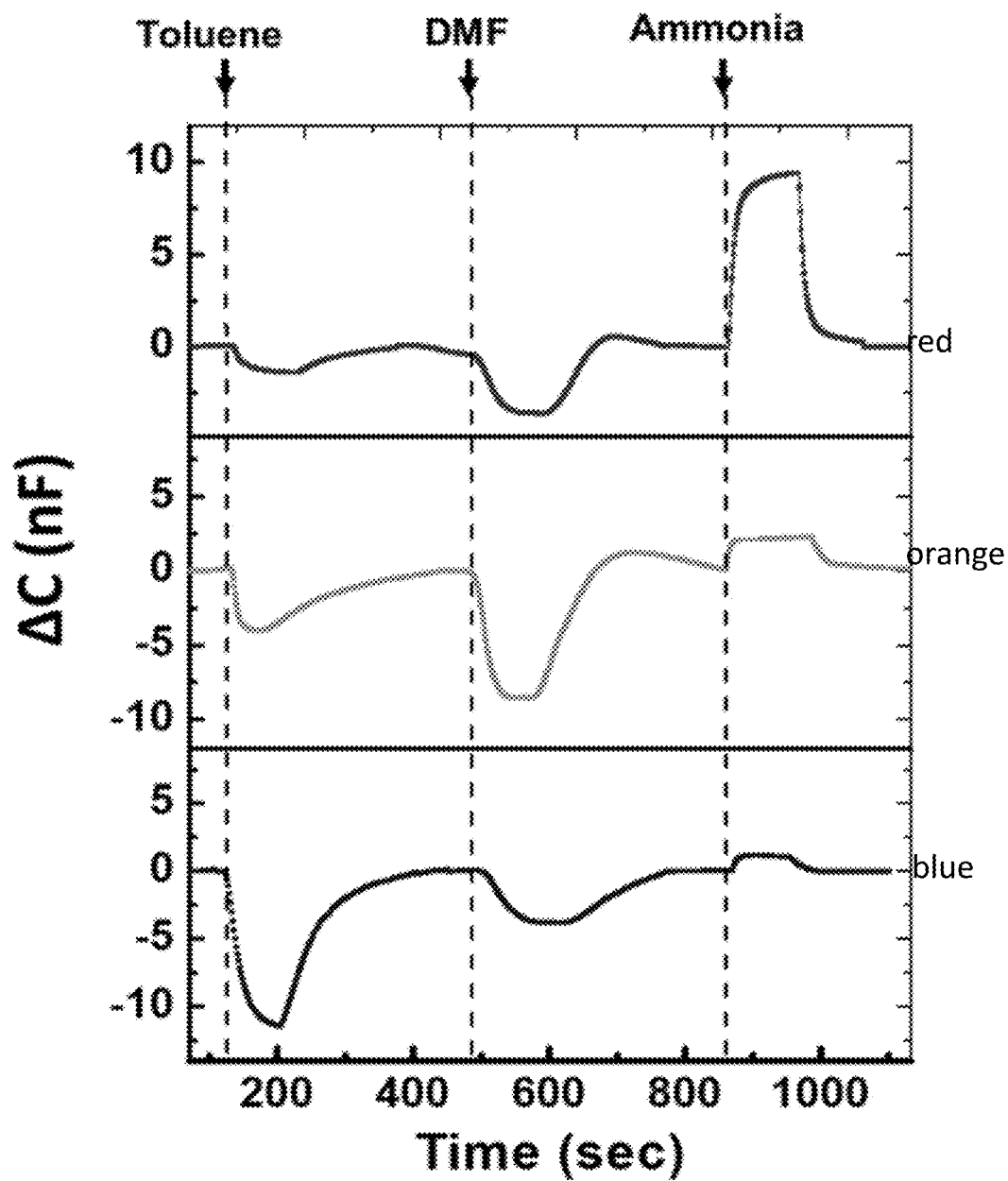
Figure 3B:
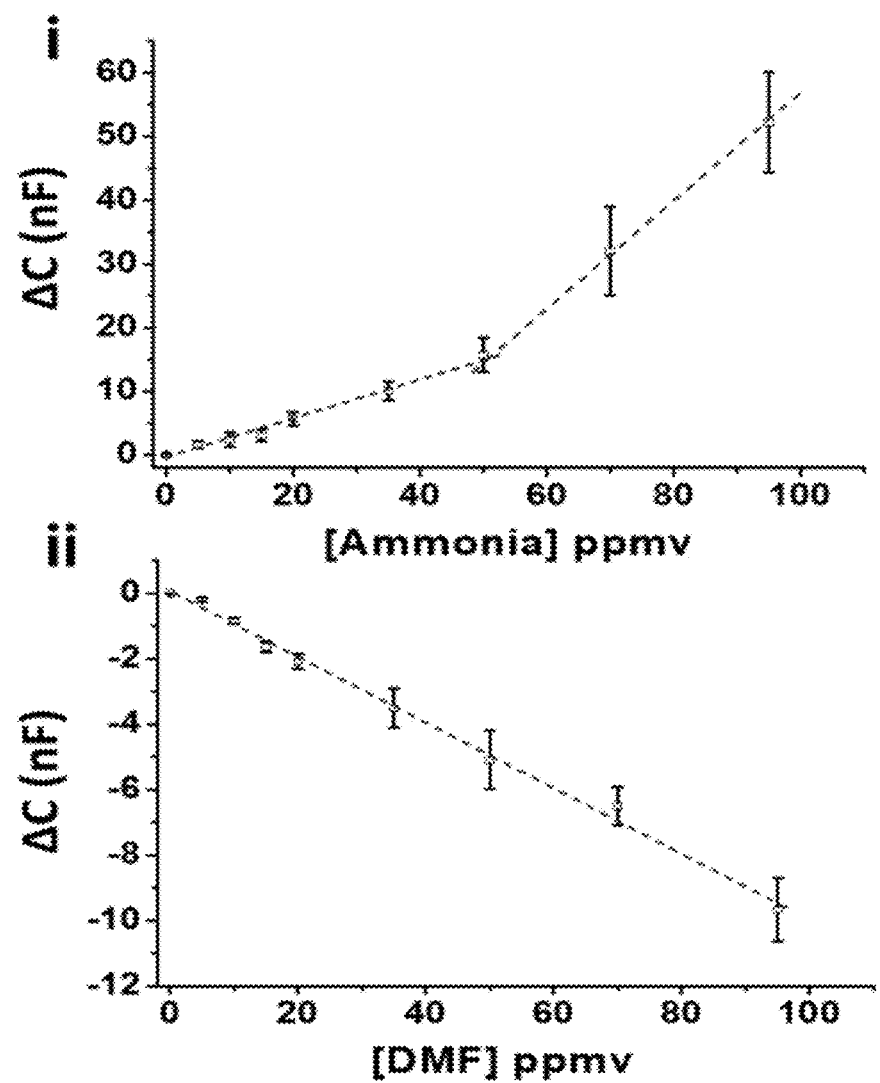
Figure 3C:
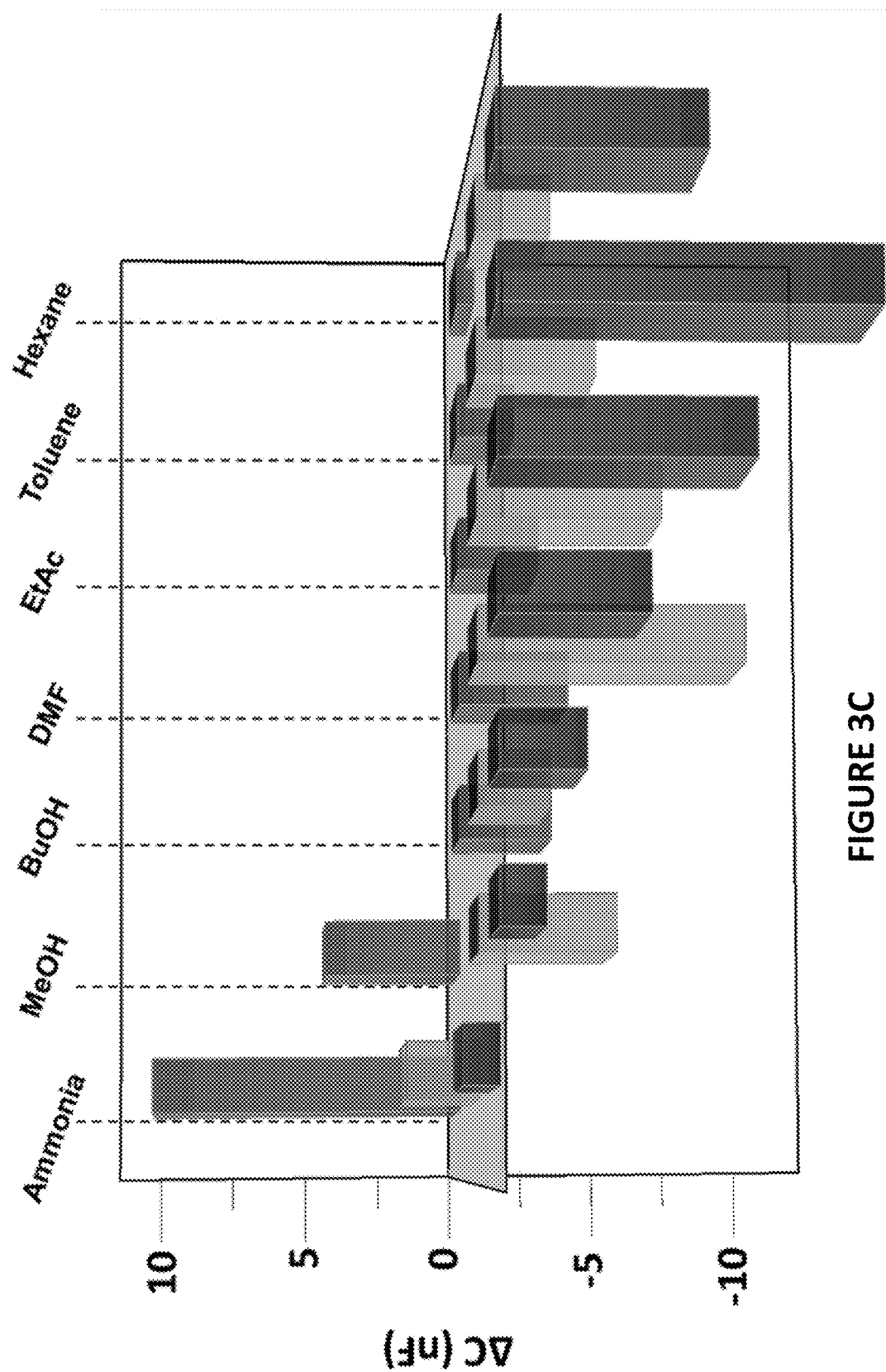

FIGS. 3A-3C include capacitive response of the carbon-dot-IDE sensors to gas vapors. (3A) Capacitive transformations recorded for the red-C-dot-IDE, orange-C-dot-IDE and blue-C-dot-IDE, respectively, upon exposure and subsequent purging of gas molecules (concentrations of all vapor molecules were 35 ppmv, determined by GC-MS). The arrows indicate times of gas injection. Purging of the gases was carried out after the capacitance reached plateaus. (3B) Capacitive dose-response curves for (i) NH3, and (ii) DMF recorded for the red-C-dot-IDE sensor. Linear fittings of the datapoints are presented; R2 above 0.98 was obtained in all linear fits. (3C) Bar diagram depicting the capacitance changes at saturation following exposure of the C-dot-IDEs to gas molecules at a concentration of 35 ppmv.

Figure 4A:
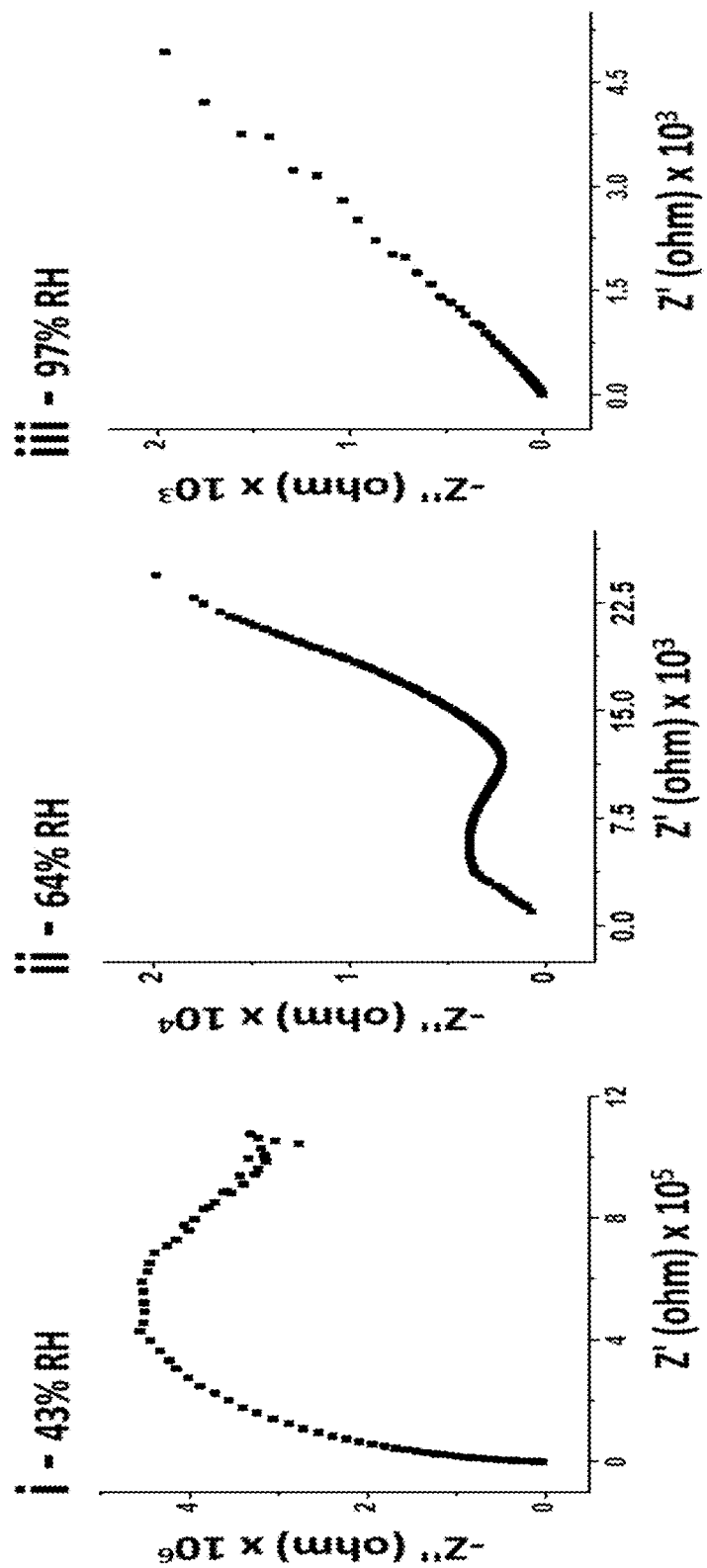
Figure 4B:
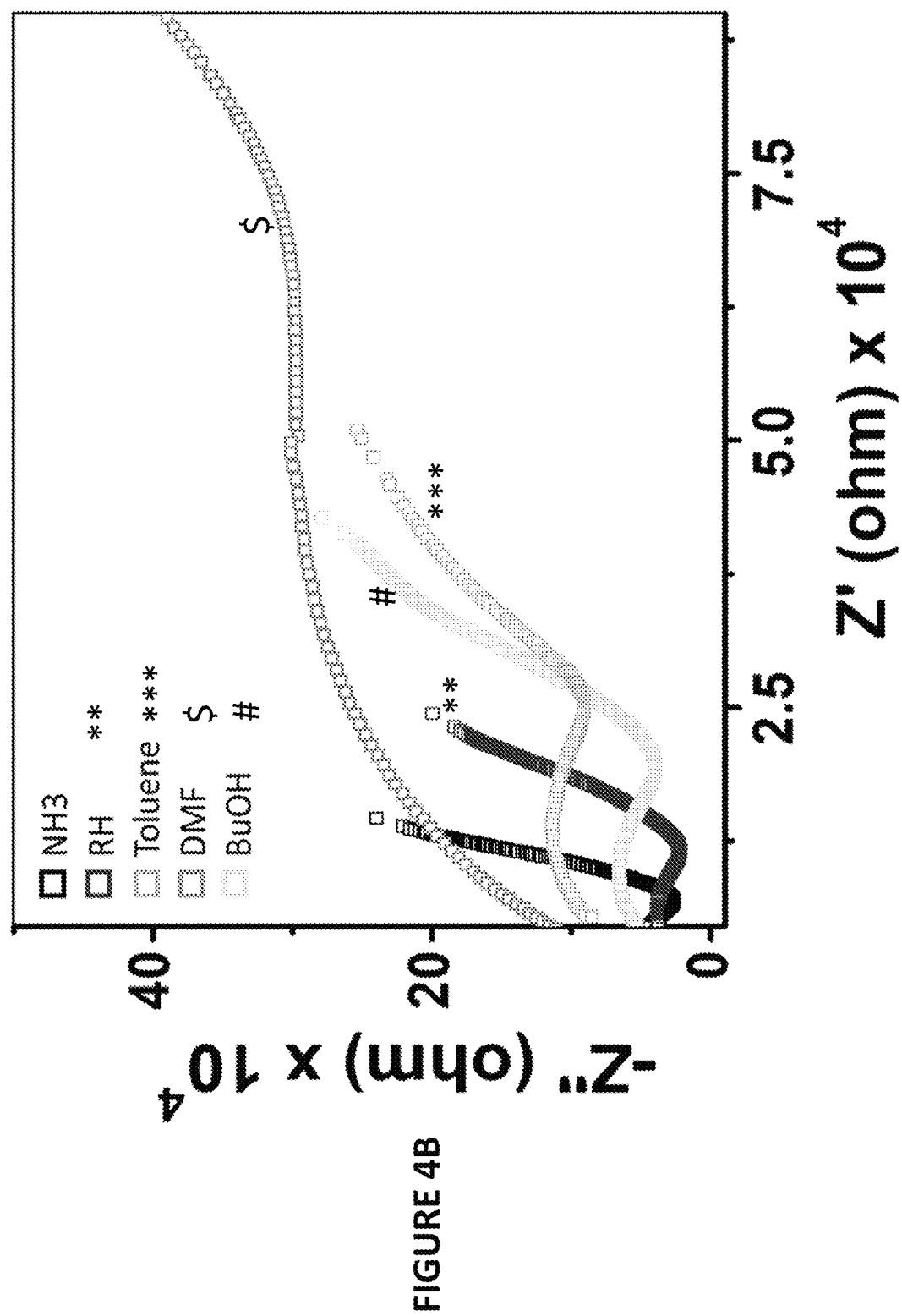

FIGS. 4A-4B include graphs showing impedance spectroscopy of the carbon-dot-IDEs upon exposure to different vapors. (4A) Nyquist plots of the orange-C-dot-IDE recorded in the indicated relative humidity (RH) levels: 43% (i), 64% (ii), and 97% (iii). (4B) Nyquist plots of the orange-C-dot-IDE recorded following exposure to different gas molecules (RH was 64%; concentrations of gas molecules were all 35 ppmv).

FIGS. 5A-5E include graphs showing monitoring the growth and distinguishing bacteria with the carbon-dot-IDE artificial nose (e.g. a non-limiting exemplary sensor of the invention). (5A) Experimental setup. C-dot-IDEs comprising red C-dots, orange C-dots, and blue C-dots, respectively, provide continuous monitoring of capacitance changes induced by bacterially emitted volatile molecules. (5B) Time-dependent capacitive response curves recorded for the different bacteria: *Escherichia coli* (i); *Pseudomonas aeruginosa* (ii); *Bacillus subtilis* (iii); and *Staphylococcus aureus* (iv). Red curves: red-C-dot-IDE; orange curves: orange-C-dot-IDE; blue curves: blue-C-dot-IDE. The curves represent average values of three replicates per each electrode. (5C) Capacitance changes recorded after 20-hour bacterial growth. (5D) Principal components analysis (PCA) showing capacitive response cluster differentiation according to bacterial strain. Turbidity assay: Evaluate bacterial growth for four bacterial strains *Escherichia coli* (i), *Pseudomonas aeruginosa* (ii), *Bacillus subtilis* (iii) and *Staphylococcus aureus* (iv), cultured in Luria-Bertani (LB) medium at 37 and 28° C. for gram-negative and gram-positive bacteria. (5E) Time-dependent capacitive response curves recorded for the different bacteria: *Escherichia coli* (i), *Pseudomonas aeruginosa* (ii), *Bacillus subtilis* (iii) and *Staphylococcus aureus* (iv), cultured in Luria-Bertani (LB) medium at 37 and 28° C. for gram-negative and gram-positive bacteria, respectively.

FIGS. 6A-E include images and graphs representing spectroscopic characterization of the C-dots; (FIGS. 6A-B) are photographs of the C-dots in aqueous solution under visible (6A) and UV λ=356 nm light (6B). (FIGS. 6C-E) are graphs representing PL emission spectra of blue C-dots (6C), orange C-dots (6D) and red C-dot (6E), in aqueous solution at different excitation wavelengths (from 300 to 540 nm in 20 nm increments).

Figure 7C:
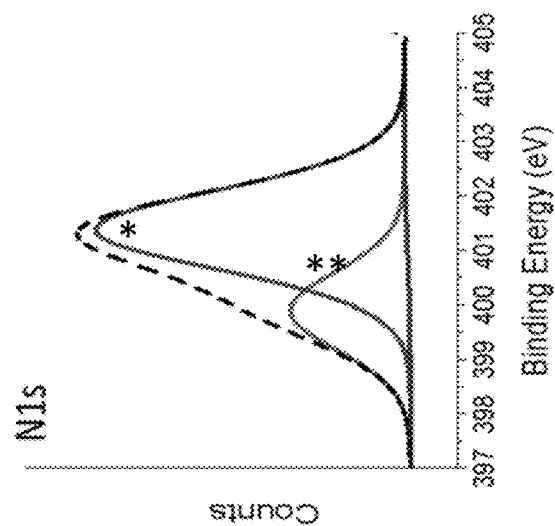
Figure 7B:
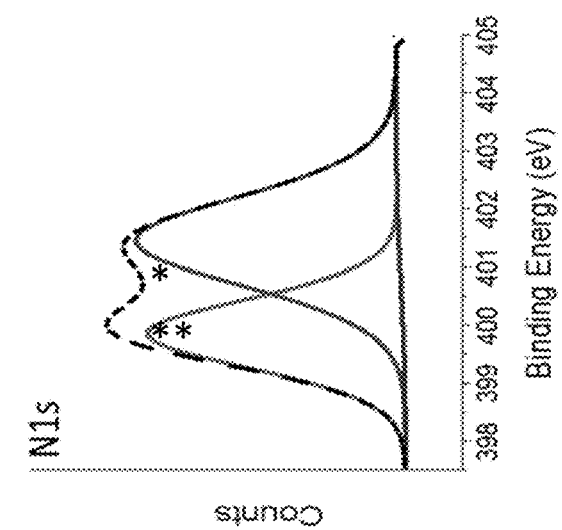
Figure 7A:
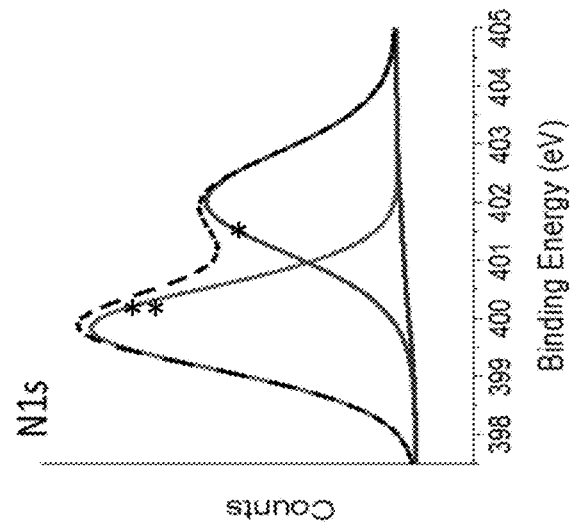
Figure 7F:
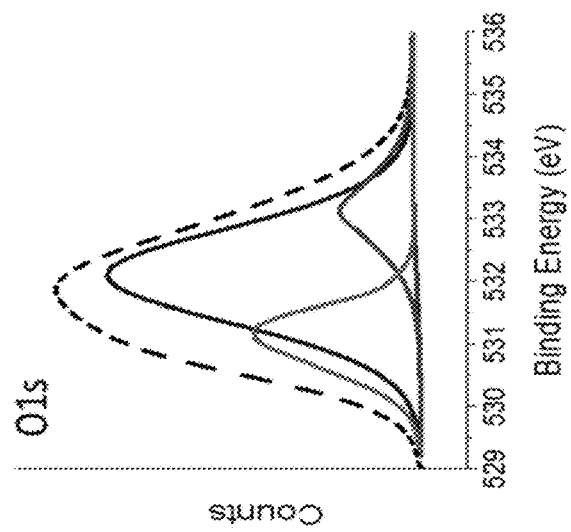
Figure 7E:
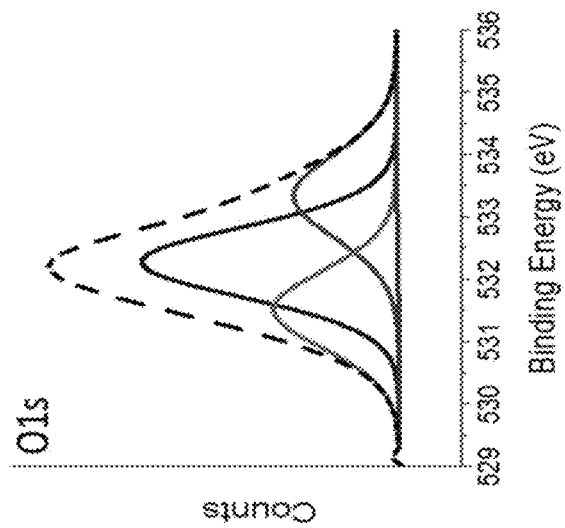
Figure 7D:
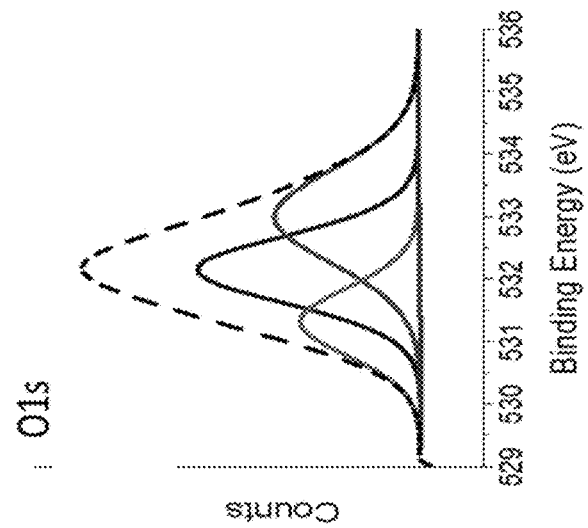

FIGS. 7A-F are high resolution XPS spectrum scan of all C-dots, displays a N1s and O1s spectrums. FIGS. 7A-C represent N1s spectrums of blue C-dots (7A), orange C-dots (7B) and of red C-dots (7C), respectively. FIGS. 7D-F represent O1s spectrums of blue C-dots (7D), orange C-dots (7E) and of red C-dots (7F), respectively. X-ray photoelectron spectroscopy (XPS) findings were used to further investigate the surfaces of these samples. In the high-resolution spectra the N is band can be deconvoluted into two peaks at 399.9 and 401.5 eV, representing C—N(green curve, assigned by **), and N—H bond (pink curve, assigned by *), respectively. The O1s band contains three peaks at 531.4 532.3 and at 533.2 eV for C═O, C—O and COO— respectively. The results from the XPS spectra showed that the composition of hydrophilic functional groups on the surface not just contribute to their optical properties, causing a red shift with the relative increase in N—H bond peak. But also effecting the overall particle surface polarity. Moreover, the Red-C-dot showed the highest nitrogen content (14.83%) compared to the Orange and Blue C-dots with 12.37 and 6.47% respectively. This is firmly established the differences in the degree of surface oxidation, which primarily controls the surface states of the separate C-dots, along with tunable photoluminescence properties.

Figure 8:
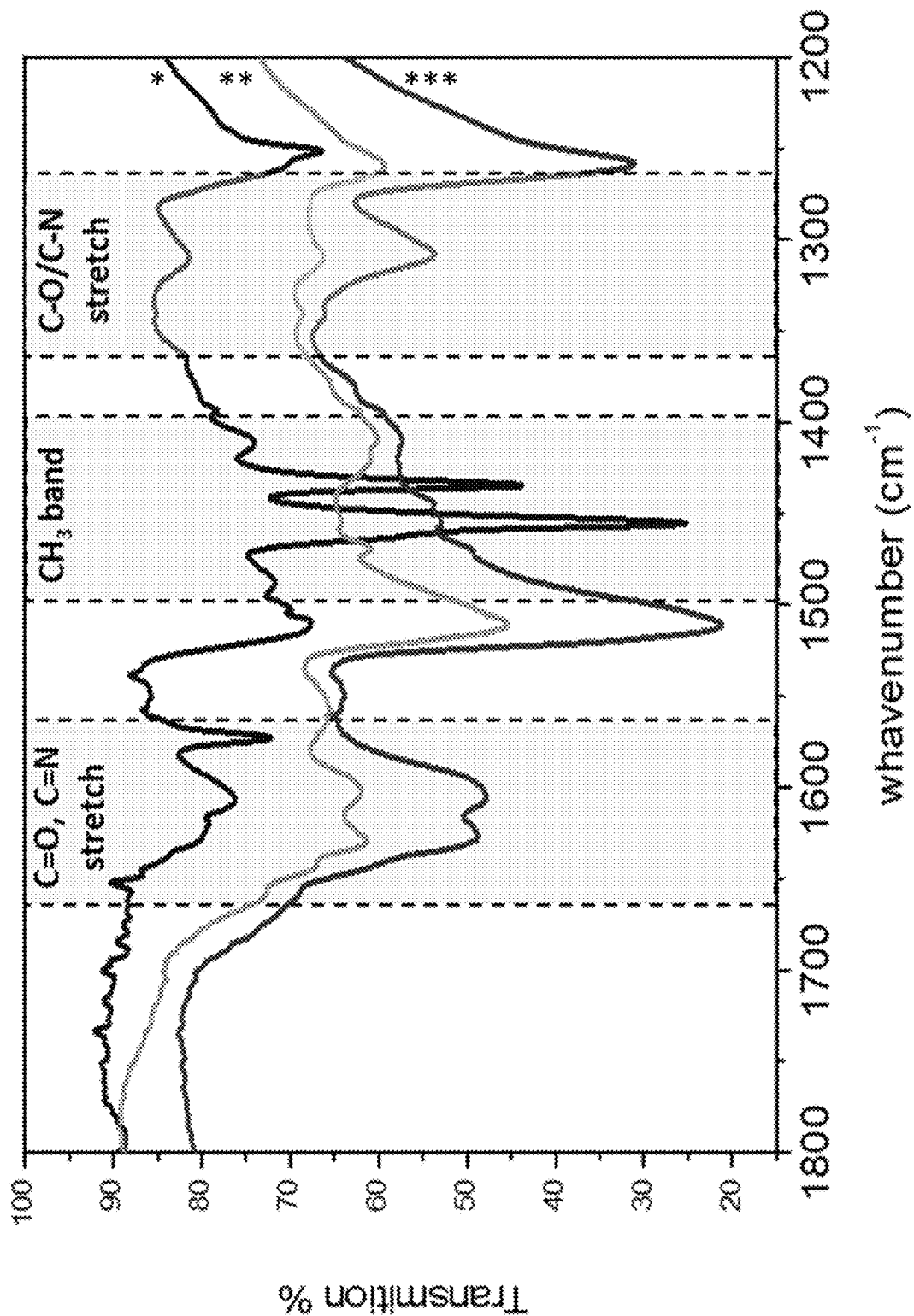

FIG. 8 is a graph exhibiting Fourier transform infrared (FTIR) spectra of the three C-dots: Blue C-dots (*), Orange C-dots () and Red C-dots (*). The FTIR spectra reveal that the C-dots exhibited characteristic stretching vibrations of absorption bands of C═O, C═N stretching peaks at about 1560-1670 cm', CH3 banding peaks at about 1400-1500 cm⁻1 and C—O, C—N stretching peaks at about 1250-1350 cm$^{-1}$. The comparison of the FTIR spectra of the three samples reveals two important observations. One is an enhancement of the typical stretching vibration of C—N/C—O and C═O/C═N bonds with C-dots polarity, indicating an increase in the degree of oxidation accompanying the Photoluminescence red shift of the C-dots. The other is that the CH3 vibration bands are strong and discrete for Blue C-dots, but small and insignificant for Orange and Red C-dots. It is postulated that non-polar C-dots are substantially devoid of hydrophilic surface groups.

Figure 9:
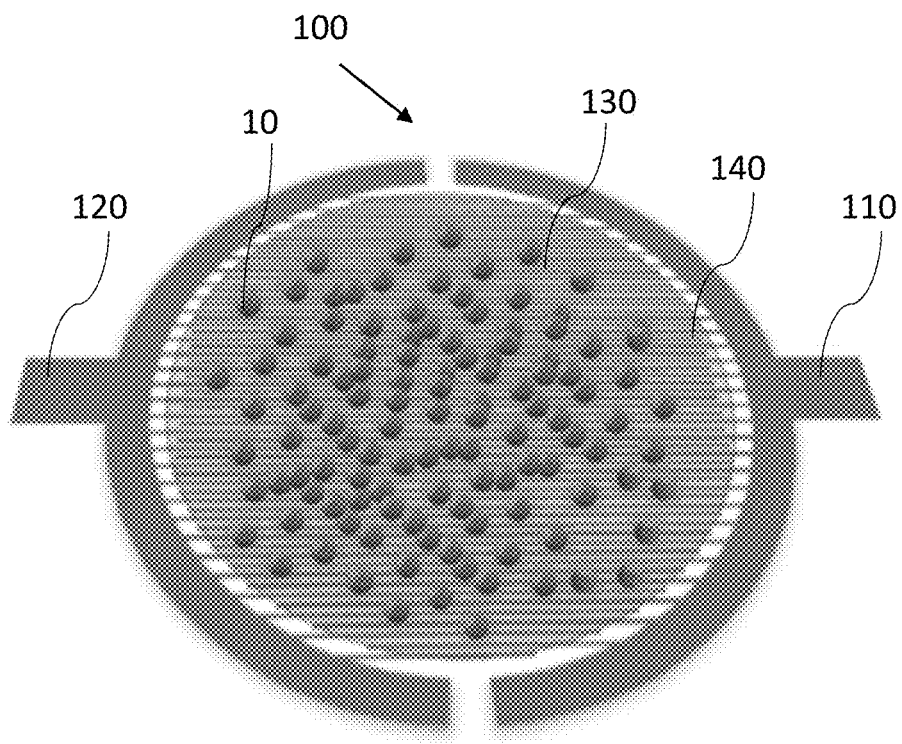

FIG. 9 is a scheme representing a non-limiting exemplary configuration of the capacitive sensor of the invention, comprising a sensing unit containing C-dots deposited on top of an electrode.

Figure 10A:
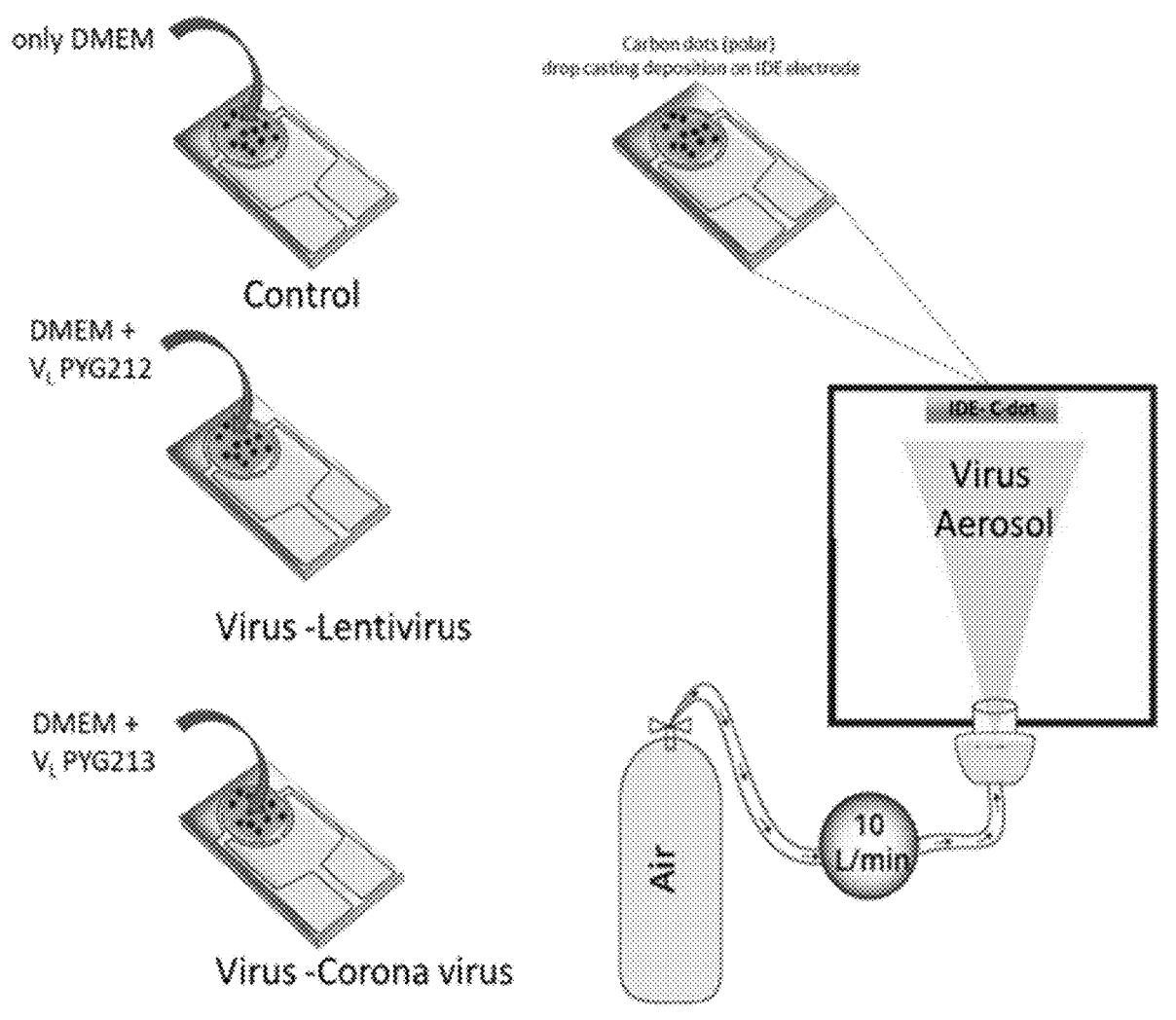
Figure 10B:
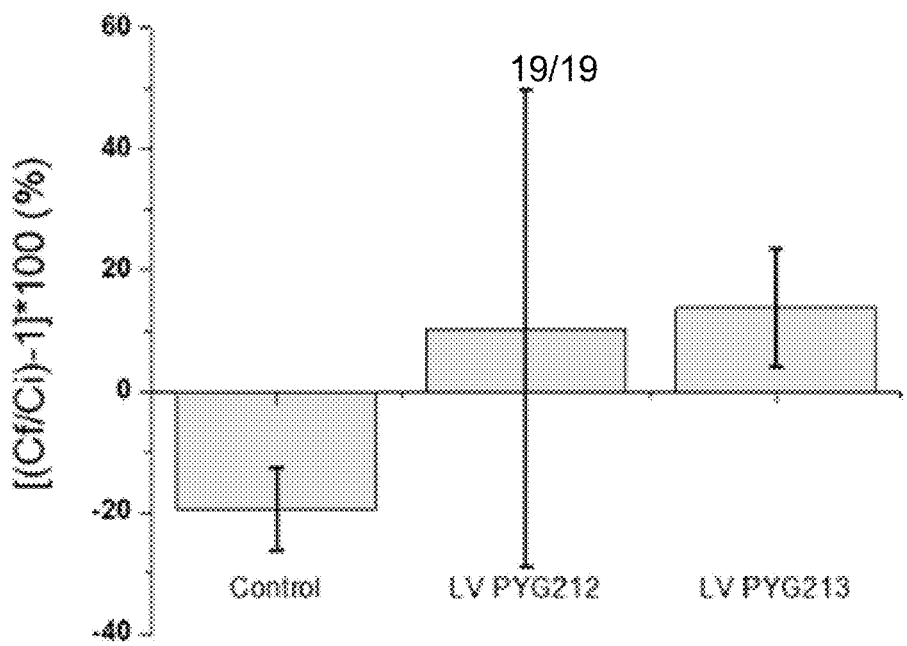
Figure 10C:
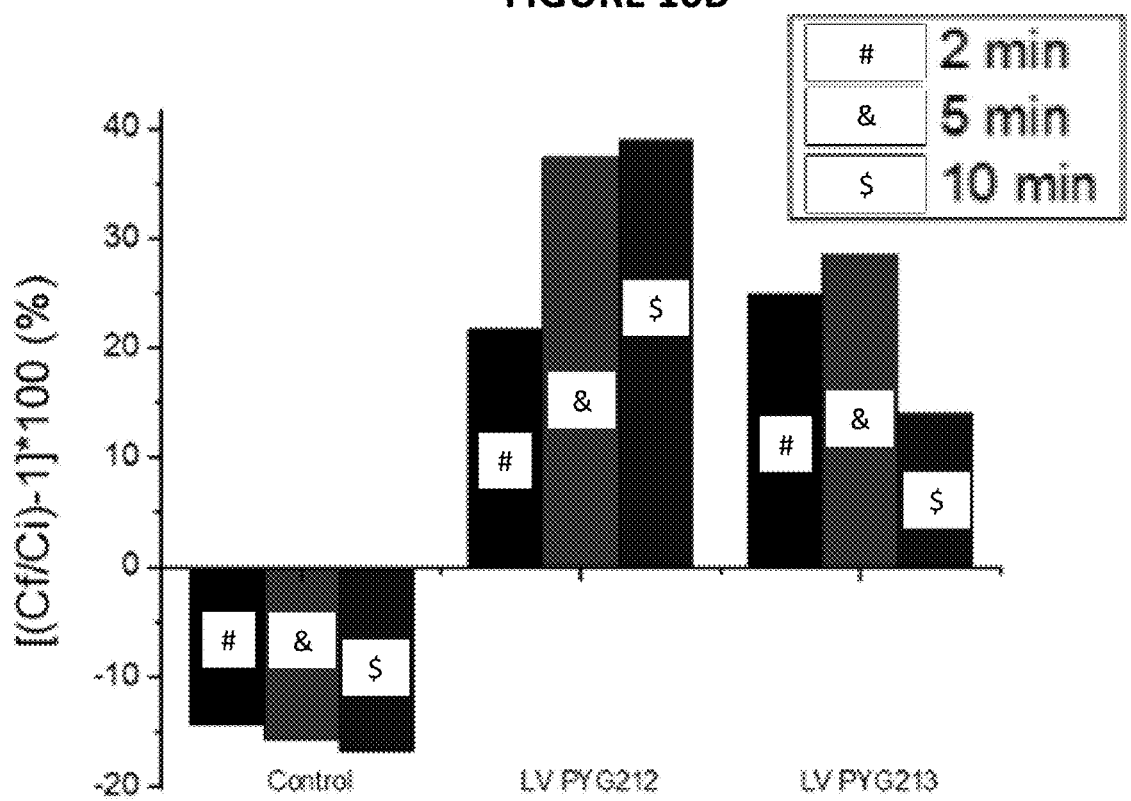

FIGS. 10A-C represent a scheme illustrating a non-limiting configuration of the virus-aerosol apparatus used for the virus detection in air (10A), and bar graphs showing capacitance change following 2 min exposure to different viruses and a control with only DMEM medium (10B), and detection of virus species in a gaseous sample at different concentrations (10C).

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

The invention in some embodiments thereof is based on a surprising finding that a capacitive sensor array comprising at least three sensing elements, each composed inter alia of carbon dots with different content of polar surface groups (such as amino, hydroxy, carboxy, carbonyl, and imino or any combination thereof) and characterized by different surface polarity exhibited remarkable sensitivity to a broad range of volatile compounds (VC). In some embodiments, the array of the invention is configured to generate different capacitance values (e.g. capacitance profile) in response to exposure thereof to a specific analyte or a specie (VCs). Thus, the array of the invention has been implemented to distinguish between VC profiles generated by different species of interest (pathogens), based on differential sensitivity and/or selectivity of each of the sensing element to a specific VC. In some embodiments, the VC is a pathogen-derived VC.

A device (sensor) based on the capacitive sensor array of the invention, has been successfully implemented by the inventors for highly selective detection of specific pathogens of interest (bacteria and viruses) in a gaseous sample.

In some embodiments, the terms "capacitive sensor array of the invention" and "C-dot-IDE capacitive sensor", "C-dot-IDE electrode" or "C-dot-IDE sensor" are used herein interchangeably.

In some embodiments, the terms "microbe" or "microorganism" and the term "pathogen" are used herein interchangeably encompassing bacteria, fungi, viruses, and any other pathogens.

In one aspect of the invention, there is provided a sensor array, wherein: said array comprises a plurality of capacitive sensors; each capacitive sensor comprises a sensing element electrically connected to the two electrodes and comprising carbon dots; the carbon dots of each of the plurality of capacitive sensors are characterized by different surface polarity. In some embodiments, each of the plurality of capacitive sensors comprise carbon dots characterized by a similar surface polarity. In some embodiments, each carbon dot independently comprises hydrophilic surface groups. In some embodiments, each capacitive sensor is characterized by (i) different surface polarity of the carbon dots; and (ii) different sensitivity and/or selectivity to a specific specie of interest (e.g. to a specific VC).

In some embodiments, the plurality of capacitive sensors comprises at least 3 capacitive sensors. In some embodiments, the plurality of capacitive sensors comprises 3, 4, 5, 10, 30, or 100 sensors, including any range between, wherein each sensor comprising carbon dots with different surface polarity. In some embodiments, the surface polarity of the carbon dot is predetermined by: (i) chemical composition of the hydrophilic surface groups; (ii) weight content of the hydrophilic surface groups within the carbon dot, or by both (i) and (ii). In some embodiments, the term "capacitive sensor" and the term "sensor" are used herein interchangeably. In some embodiments, the term "analyte" and the term "specie" are used herein interchangeably and refer to a microbe and/or to a VC.

A "carbon dot" or a C-dot as used herein is a carbon nano particle, generally of a graphene framework and of a generally spherical structure. In some embodiments, the carbon dot of the invention is non-uniformly shaped. In some embodiments, a plurality of carbon dot of the invention is devoid of a defined shape (e.g. the particles have a random shape). In some embodiments, the carbon dot of the invention is characterized by substantially spherical shape, elliptical shape, and/or a cylindrical shape. C-dots of the invention are in the nano range of about 2 to 100 nanometers (nm) in size while many are in the 2 to 7 nm, 1 to 5 nm, 1 to 10 nm, 2 to 15 nm and/or 2 to 5 nm size, including any range between. The hydrophilic groups on the surface of the carbon dot contribute to the surface polarity of the C-dot. In some embodiments, hydrophilic groups predetermine affinity and/or sensitivity of the carbon dot to a specific VC, and it also predetermines fluorescence spectrum of the carbon dot. For example, hydrophilic (or polar) carbon dots are characterized by red color (also used herein as "red dots") and an emission maximum at about 620-670 nm; medium hydrophilic carbon dots are characterized by orange color (also used herein as "orange dots") and an emission maximum at about 550-600 nm; hydrophobic (or substantially non-polar) carbon dots are characterized by blue color (also used herein as "blue dots") and an emission maximum at about 400 nm, as demonstrated by FIGS. 6A-E. Carbon dots characterized by different polarity and/or different content of the hydrophilic surface groups can be obtained as described herein (Examples), e.g. by utilizing separating techniques for nano sized particles (such as silica column separation).

In some embodiments, each carbon dot comprises a carbon-based core (e.g. in a form of polyaromatic graphene-like structure), and an outer portion (or shell) comprising the hydrophilic surface groups. In some embodiments, each carbon dot comprises a hydrophobic (e.g. substantial non-polar) core bound to the shell. In some embodiments, the shell is at least partially in contact with the core. In some embodiments, the hydrophilic surface groups are covalently bound to the outer portion (or outer surface) of the carbon-based core, to form a shell.

In some embodiments, the hydrophilic surface groups are chemisorbed and/or physisorbed to the carbon-based core. In some embodiments, the hydrophilic surface groups are stably bound to the carbon-based core. In some embodiments, the term "stable" refers to the chemical stability (e.g. substantially devoid of bond cleavage) of the bond under ambient conditions (a temperature of less than 100° C., normal pressure or vacuum, and optionally ambient atmosphere), for a time period of between 1 day and 1 year including any range between.

In some embodiments, the shell is in a form of a layer. In some embodiments, the shell is in a form of a consecutive layer, optionally having a substantially uniform thickness. In some embodiments, the shell substantially encloses the carbon-based core. In some embodiments, the shell is a porous shell. In some embodiments, the shell comprises a plurality of layers.

In some embodiments, the hydrophilic surface groups comprise heteroatoms (such as nitrogen and oxygen atoms). In some embodiments, each carbon dot comprises hydrophilic surface groups, wherein the surface groups comprise nitrogen and oxygen atoms. In some embodiments, hydrophilic surface groups comprise any of: an amine group, an imine group, a carbonyl group, a carboxy group, ester, ether, nitro, cyano, amide, and a hydroxy group or any combination thereof.

In some embodiments, the plurality of capacitive sensors within the array of the invention comprises at least a first sensor, a second sensor and a third sensor and optionally one or more additional sensors; wherein the carbon dots of the first sensor, the second sensor, of the third sensor and optionally of the additional sensor(s) are characterized by different surface polarity. In some embodiments, each of the first sensor, a second sensor and a third sensor and optionally of the one or more additional sensors comprises a sensing element, wherein the sensing element comprises a plurality of carbon dots characterized by substantially the same polarity. In some embodiments, each of the first sensor, a second sensor and a third sensor and optionally of the one or more additional sensors comprises one or more sensing elements. In some embodiments, the array of the invention is a parallel circuit, comprising the plurality of capacitive sensors connected in parallel. In some embodiments, the sensing element of the first sensor comprises carbon dots (also referred to herein as polar C-dots) characterized by surface polarity greater than the surface polarity of carbon dots of the second sensor and of the third sensor. In some embodiments, the sensing element of the second sensor comprises carbon dots (also referred to herein as medium polar C-dots) characterized by surface polarity greater than the surface polarity of carbon dots of the third sensor. In some embodiments, the sensing element of the third sensor comprises substantially non-polar carbon dots (also referred to herein as non-polar C-dots).

In some embodiments, the different surface polarity of the carbon dots is predetermined by different weight content of the hydrophilic surface groups within the carbon dot. In some embodiments, atomic ratio between the carbon atoms and the heteroatoms (e.g. O and N) within the carbon dots of the first sensor, of the second sensor, and of the third sensor is between 0.2 and 1.9, between 2 and 2.9, and between 3 and 8, respectively. In some embodiments, the atomic ratio between (i) carbon content and (ii) a combined nitrogen and oxygen content of the carbon dots of the first sensor, of the second sensor, and of the third sensor is between 0.2 and 1.9, between 2 and 2.9, and between 3 and 8, respectively.

In some embodiments, atomic ratio between the carbon atoms and the heteroatoms (e.g. O and N) within the carbon dots of the first sensor is between 0.2 and 1.9, between 0.2 and 0.5, between 0.5 and 1, between 1 and 1.9, between 1 and 2, between 1 and 2.1, between 1 and 1.4, between 1 and 1.2, between 1.2 and 1.4, between 1.4 and 1.9, between 1.4 and 2, between 1.4 and 1.6, between 1.4 and 1.8, between 1.4 and 1.5, between 1.5 and 1.8, between 1.8 and 2.1, including any range between. In some embodiments, atomic ratio between the carbon atoms and the heteroatoms (e.g. O and N) within the polar C-dots is at most 2.3, at most 2, at most 1.8, at most 1.7, at most 1.6, at most 1.4, at most 1, including any range between. In some embodiments, atomic ratio between the carbon atoms and the heteroatoms (e.g. O and N) within the polar C-dots is at least 0.2, at least 0.3, at least 0.5, at least 0.7, at least 0.8, at least 0.9, at least 1, at least 1.2, at least 1.4, including any range between.

In some embodiments, atomic ratio between the carbon atoms and the heteroatoms (e.g. O and N) within the carbon dots of the second sensor is between 2 and 2.9, between 2 and 3, between 2 and 2.2, between 2 and 2.6, between 2 and 2.8, between 2.2 and 2.4, between 2.4 and 2.9, between 2.4 and 3, between 2.4 and 2.6, between 2.2 and 2.8, between 2.2 and 2.9, between 2.2 and 3, between 2.5 and 2.8, between 2.8 and 3.1, including any range between. In some embodiments, atomic ratio between the carbon atoms and the heteroatoms (e.g. O and N) within the medium polar C-dots is at most 3.1, at most 3, at most 2.8, at most 2.7, at most 2.6, at most 2.4, at most 2.2, including any range between. In some embodiments, atomic ratio between the carbon atoms and the heteroatoms (e.g. O and N) within the polar C-dots is at least 1.8, at least 2, at least 2.1, at least 2.2, at least 2.4, including any range between.

In some embodiments, atomic ratio between the carbon atoms and the heteroatoms (e.g. O and N) within the carbon dots of the third sensor is between 3 and 8, between 2.8 and 5, between 2.8 and 4, between 2.8 and 3, between 3 and 4, between 4 and 5, between 3 and 3.6, between 3.6 and 5, between 3.6 and 4, between 3 and 3.2, between 3.2 and 4, between 3.2 and 3.6, between 3.4 and 4, between 3.4 and 5, between 4 and 4.5, between 4.5 and 5, between 5 and 6, between 6 and 8, including any range between.

In some embodiments, a molar ratio between the amine group and the imine group of the polar C-dots is between 1.5 and 3, between 1.5 and 2, between 1.5 and 1.7, between 1.7 and 3, between 1.7 and 2, between 1.7 and 2.5, between 1.7 and 2.8, between 1.7 and 2.2, between 1.5 and 2.2, between 1.5 and 2.5, between 1.5 and 3.5, between 1.5 and 4, including any range between.

In some embodiments, a molar ratio between the amine group and the imine group of the medium polar C-dots is between 0.8 and 1.4, between 0.8 and 1.5, between 0.7 and 1.5, between 0.8 and 1, between 0.8 and 1.3, between 0.8 and 1.7, between 1 and 1.3, between 1 and 1.5, between 1 and 1.4, including any range between.

In some embodiments, a molar ratio between the amine group and the imine group of the medium polar C-dots is between 0.1 and 1, between 0.1 and 0.8, between 0.1 and 0.2, between 0.2 and 0.8, between 0.2 and 0.5, between 0.5 and 0.8, between 0.8 and 1, including any range between.

In some embodiments, a nitrogen content of the polar carbon dots is between 13 and 20 at %, between 12.8 and 20 at %, between 12.8 and 13 at %, between 13 and 15 at %, between 15 and 17 at %, between 17 and 20 at %, between 13 and 17 at %, between 13 and 25 at %, between 13 and 30 at %, including any range between.

In some embodiments, nitrogen content of the medium polar carbon dots is between 10 and 12.9 at %, between 10 and 11 at %, between 10 and 13 at %, less than 12.9 at %, less than 13 at %, less than 12.6 at %, less than 12.5 at %, less than 12 at %, including any range between.

In some embodiments, nitrogen content of the non-polar carbon dots is between 1 and 9.9 at %, between 0.5 and 10 at %, between 0.5 and 1 at %, between 1 and 5 at %, between 0.5 and 5 at %, between 0.5 and 1 at %, between 1 and 8 at %, between 1 and 9 at %, between 5 and 10 at %, between 5 and 9 at %, between 9 and 10 at %, between 9 and 9.9 at %, less than 10 at %, less than 11 at %, less than 10.5 at %, less than 9.9 at %, less than 9 at %, including any range between.

In some embodiments, oxygen content of the polar carbon dots is between 20 and 30 at %, between 20 and 23 at %, between 20 and 25 at %, between 20 and 27 at %, between 20 and 29 at %, between 23 and 25 at %, between 25 and 30 at %, including any range between.

In some embodiments, oxygen content of the medium polar carbon dots is between 10 and 20 at %, between 10 and 13 at %, between 10 and 15 at %, between 10 and 17 at %, between 10 and 19 at %, between 10 and 19.9 at %, between 13 and 15 at %, between 15 and 20 at %, between 15 and 18 at %, between 15 and 19 at %, between 15 and 19.9 at %, less than 20 at %, less than 23 at %, less than 21 at %, less than 22 at %, including any range between.

In some embodiments, oxygen content of the non-polar carbon dots is between 1 and 10 at %, between 1 and 9.9 at %, between 1 and 5 at %, between 1 and 7 at %, between 1 and 9 at %, between 3 and 5 at %, between 5 and 9 at %, less than 10 at %, less than 12 at %, less than 11 at %, less than 9.9 at %, less than 9.5 at %, less than 9 at %, including any range between.

In some embodiments, carbon content of the polar carbon dots is between 50 and 65 at %, between 40 and 65 at %, between 40 and 50 at %, between 50 and 55 at %, between 50 and 60 at %, between 60 and 65 at %, between 45 and 60 at %, less than 68 at %, less than 66 at %, less than 65 at %, less than 64 at %, including any range between.

In some embodiments, carbon content of the medium polar carbon dots is between 66 and 79 at %, between 66 and 70 at %, between 66 and 72 at %, between 68 and 70 at %, between 68 and 79 at %, between 70 and 79 at %, between 70 and 75 at %, between 75 and 79 at %, between 75 and 80 at %, between 68 and 75 at %, less than 80 at %, less than 83 at %, less than 81 at %, less than 82 at %, less than 79 at %, less than 78 at %, less than 75 at %, including any range between.

In some embodiments, carbon content of the non-polar carbon dots is between 80 and 95 at %, between 78 and 90 at %, between 78 and 95 at %, between 80 and 98 at %, between 80 and 85 at %, between 80 and 90 at %, between 85 and 90 at %, between 85 and 93 at %, between 90 and 95 at %, less than 98 at %, less than 97 at %, less than 95 at %, less than 93 at %, less than 90 at %, at least 80 at %, at least 78 at %, at least 82 at %, including any range between.

In some embodiments, each of the polar, medium polar and non-polar carbon dots are characterized by an XPS spectrum, as represented in FIGS. 7A-F.

In some embodiments, each of the polar, medium polar and non-polar carbon dots are characterized by an IR spectrum, as represented in FIG. 8. In some embodiments, each of the polar and medium polar C-dots exhibit C=O, C=N stretching peaks between about 1560 and 1670 cm', and C—O, C—N stretching peaks between about 1250 and 1350 $cm^{-1}$ in the IR spectrum. In some embodiments, IR spectrum of non-polar C-dots is substantially devoid of peaks between about 1560 and 1670 cm', and/or between about 1250 and 1350 cm'. In some embodiments, IR spectrum of non-polar C-dots comprises aliphatic and/or aromatic hydrocarbon peaks (e.g. between about 1400 and 1500 $cm^{-1}$).

In some embodiments, each of the polar, medium polar and non-polar carbon dots is characterized by a different water contact angle. In some embodiments, the polar carbon dots are characterized by a water contact angle of less than 50, less than 40, less than 35, less than 30, less than 25, or at least 10, or at least 15°, including any range between. In some embodiments, the medium polar carbon dots are characterized by a water contact angle of less than 70, less than 65, less than 60, less than 55, or at least 40, or at least 50°, including any range between.

In some embodiments, the non-polar carbon dots are characterized by a water contact angle of less than 100, less than 90, less than 85, less than 80, less than 75, or at least 65, or at least 70°, including any range between.

In some embodiments, the carbon dots of the invention are substantially devoid of a metal.

In some embodiments, the carbon dots of the invention are characterized by a particle size in a range between 1 and 100 nm, between 1 and 10 nm, between 1 and 5 nm, between 5 and 10 nm, between 10 and 20 nm, between 20 and 50 nm, between 10 and 50 nm, between 50 and 100 nm, including any range between. In some embodiments, the carbon dots of the invention are characterized by a particle size in a range between 1 and 5 nm, between 1 and 3 nm, between 3 and 5 nm, between 5 and 7 nm, between 7 and 10 nm, including any range between.

In some embodiments, the term "particle size" refers to average cross section size of the carbon dots.

In some embodiments, the term "average cross section size" may refer to either the average of at least e.g., 70%, 80%, 90%, or 95% of the carbon dots, or in some embodiments, to the median size of the plurality of carbon dots. In some embodiments, the term "average cross section size" refers to a number average of the plurality of carbon dots. In some embodiments, the term "average cross section size" may refer to an average diameter of substantially spherical carbon dots.

In some embodiments, each of the polar, medium polar and non-polar carbon dots of the invention is characterized by different sensitivity to a specific VC, wherein sensitivity is as described herein.

In some embodiments, each of the polar, medium polar and non-polar carbon dots of the invention is characterized by enhanced binding affinity for the VC of interest, as compared to a control. In some embodiments, the binding affinity of the carbon dots for the VC of interest is enhanced by at least 10%, at least 20%, at least 50%, at least 100%, by at least 2 times, at least 3 times, at least 5 times, at least 10 times, at least 100 times, at least 1000 times, at least 10.000 times, at least 1000.000 times, including any range between, as compared to a binding affinity for a control.

In some embodiments, each of the polar, medium polar and non-polar carbon dots of the invention is characterized by enhanced binding affinity for the VC of interest, as compared to a control, wherein a concentration of the VC of interest and of the control within the sample is substantially the same (e.g. less than 1000 ppm, less than 100 ppm, less than 50 ppm, less than 40 ppm, or about 35 ppm, including any range between). As used herein, the term "ppm" refers to ppmv, i.e. parts per million volume, which is known in the art.

In some embodiments, the term "enhanced binding affinity" refers to an affinity ratio between (i) the binding affinity of the carbon dots for the VC of interest and (ii) the binding affinity of the carbon dots for the control. In some embodiments, the enhanced binding affinity refers to an enhanced change in the capacitance of the carbon dot (and/or of the sensing unit) upon exposure thereof to the VC of interest, as compared to the control. In some embodiments, the VC of interest is derived from a microorganism (e.g. a bacteria or a virus). The binding affinity for a specific VC may be deduced from the response intensity of each sensor (e.g. each of the 1st, the 2nd, and/or the 3rd sensor within the sensor array of the invention) upon exposure thereof to the specific VC. For example, an enhanced binding affinity of the carbon dot for a specific VC will result in an enhanced response of the sensor and/or the array of the invention. Thus, the affinity ratio of each of the polar, medium polar, or non-polar carbon dots, predetermines the selectivity and/or sensitivity of each of the $1^{st}$, the $2^{nd}$, and/or the $3^{rd}$ sensors described herein, respectively.

In some embodiments, the different surface polarity of each of the polar, medium polar and non-polar carbon dots predetermines different affinity thereof for a specific VC. In some embodiments, the different surface polarity of each of the polar, medium polar and non-polar carbon dots predetermines that each of the sensors within the array is configured to generate a different capacitance signal in response to a specific gaseous molecule or analyte (e.g. VC).

In some embodiments, the term "response" refers to a signal generated by the sensor in response to the capacitance change of the sensing unit.

In some embodiments, the control is a gas. In some embodiments, the control refers to any atmospheric gas (e.g. N2, O2, CO2, Ar, water or any combination thereof). In some embodiments, a concentration of the control within a given gaseous sample is substantially the same or higher as the concentration of the VC of interest. For example: a concentration of VC of interest (e.g. ammonia, DMF, Hexane) within a gaseous sample may be between 1 and 1000 ppm, between 1 and 10 ppm, between 10 and 50 ppm, between 50 and 100 ppm, between 100 and 200 ppm, between 200 and 500 ppm, between 500 and 1000 ppm, including any range between; and a concentration of the control (e.g. water vapors) within a gaseous sample may be about 1% (or about 60%).

In another aspect, there is provided a sensor comprising the array of the invention, the array comprises a plurality of capacitance sensors, each sensor comprises at least two electrodes; and at least one sensing unit electrically connected to at least two electrodes and comprising a structure made from a plurality of carbon dots of the invention, and wherein the sensor is configured to detect one or more VCs of interest in a sample.

In some embodiments, the sensor and/or the system of the invention is configured to determine or to predict the presence of one or more microbes of interest and the concentration thereof within a sample. In some embodiments, the sample is a gaseous sample. In some embodiments, the gaseous sample comprises one or more VC of interest and the control. As used herein, the term VC (or VOC) refers to organic and/or inorganic small molecule (usually having a molecular weight less than 1000 Da, or less than 500 Da) characterized by high vapor pressure (e.g. at least 10-10 atm) at room temperature. In some embodiments, the VC of interest is devoid of any one of the atmospheric gases.

In some embodiments, the sensor of the invention (and/or a system comprising thereof) is configured to determine or predict the presence of a specie of interest and the concentration thereof in a location. In some embodiments, the location is selected from a solid, a liquid and a gas, including any range between. In some embodiments, the specie of interest is a microorganism (e.g. a virus, a bacterium, and a fungus or a combination thereof). In some embodiments, the specie of interest is a VC. In some embodiments, the array of the invention (and/or a system comprising thereof) is configured to detect the presence of microorganism within a specific location.

In some embodiments, each of the 1st, the 2nd, and/or the 3rd sensor within the sensor array of the invention is characterized by sensitivity and/or binding affinity to a specific. VC, wherein sensitivity and binding affinity are as described herein. In some embodiments, each of the 1st, the 2nd, and/or the 3rd sensor within the sensor array of the invention is characterized by different sensitivity and/or different binding affinity to a specific VC.

As used herein the term "sensitivity" refers to the ratio between signal intensities of the sensor in response to a specific VC of interest and in response to the control (e.g. being referred to as 1), wherein the control and the VC of interest are present within the sample.

Accordingly, the term "enhanced" when referring to sensitivity relates to the signal enhancement in response to the VC of interest, relative to the response of the sensor to the control (wherein the signal intensity in response to the control is optionally referred to as 1). In some embodiments, the VC of interest comprises one or more VCs. In some embodiments, the VC of interest comprises a polar VC, a non-polar VC, a medium polar VC or any combination thereof. In some embodiments, one or more VCs of interest is/are present within the sample at ppb and/or ppm range. In some embodiments, the concentration of the control within the sample is the substantially the same or greater than the concentration of the VC of interest.

In some embodiments, a non-polar VC is a non-polar compound (e.g. hexane, xylene, toluene, benzene) characterized by a dipole moment between 0 and 0.5, between 0 and 0.4, between 0 and 0.1, between 0.1 and 0.5, between 0.4 and 0.5, including any range between.

In some embodiments, a polar VC is a polar compound (e.g. ammonia, water, ethanol, butanol, acetone, an aldehyde) characterized by a dipole moment of at least 0.5, at least 0.6, at least 0.8, at least 1, at least 1.5, or more, including any range between.

In some embodiments, the first sensor (comprising polar C-dots) is characterized by sensitivity to a polar VC, optionally comprising amine, hydroxy, carboxy, carbonyl or any combination thereof. Non-limiting examples of polar VCs include but are not limited to: ammonia, alcohol (methanol, butanol), etc, or any combination thereof. In some embodiments, the first sensor (comprising polar C-dots) is characterized by enhanced sensitivity to a polar VC, as compared to the second and/or third sensor (comprising non-polar C-dots), wherein enhanced is as described herein.

In some embodiments, the second sensor (comprising medium polar C-dots) is characterized by sensitivity to a medium polar VC (e.g. DMF).

In some embodiments, the third sensor (comprising non-polar C-dots) is characterized by sensitivity to a non-polar VC comprising an aromatic ring, an alkyl chain or both. In some embodiments, the third sensor is characterized by enhanced sensitivity to a non-polar VC, as compared to the first and/or second sensor (, wherein enhanced is as described herein. Non-limiting examples of non-polar VCs include but are not limited to: aliphatic hydrocarbons including partially unsaturated hydrocarbons (e.g. hexane, pentane, methane, alkenes, alkynes), aromatic hydrocarbons (e.g. toluene, benzene) or any combination thereof.

In some embodiments, the sensing unit comprises at least two electrodes in contact with a plurality of carbon dots. In some embodiments, the carbon dots are bound to the outer surface of the electrodes. In some embodiments, the carbon dots are in a form of a layer on top of the electrodes. In some embodiments, the carbon dots are in a form of a multi-layered structure on top of the electrodes.

In some embodiments, surface roughness of the sensing unit is about 1 nm, about 0.5 nm, about 2 nm, about 3 nm, about 5 nm, about 8 nm, about 10 nm, about 0.1 nm, including any range between. Exemplary surface roughness of the sensing unit is as depicted in FIG. 2A.

Non-limiting example for the size of such sensing element are, a cross-section dimension ranging between 0.1 $\mu m^2$ and 1 $cm^2$, between 0.1 $\mu m^2$ and 1 $\mu m^2$, between 1 $\mu m^2$ and 10 $\mu m^2$, between 10 $\mu m^2$ and 100 $\mu m^2$, between 100 $\mu m^2$ and 1 mm2, between 1 mm2 and 1 $cm^2$, including any range between; and a thickness of between 1 nm to 100 nm, between 1 nm to 5 nm, between 5 nm to 10 nm, between 10 nm to 100 nm, including any range between.

Reference is now made to FIG. 9 which is an illustration of a capacitive sensor according to some embodiments of the invention. A capacitive sensor 100 may include: two electrodes 110 and 120 and a sensing element 130 connected to electrodes 110 and 120 and comprising a structure made from the particles 10 discloses herein below. The electrodes 110 and 120 are configured to receive electricity. Electrodes 110 and 120 may be connected to a processor/computing device that may detect changes in the capacitance of sensing element 130 in response to changes in the nearby chemical environment, for example, due to the presence of a specie of interest (e.g. a VC).

In some embodiments, sensing element 130 may include a plurality of carbon dots 10. In some embodiments, each sensing element 130 includes carbon dots with different surface polarity. The sensing element 130 may include carbon dots bound to or in contact with a conductive material 140. The conductive material 140 is further electrically connected to electrodes 110 and 120. The conductive material 140 may be in a form of an electrode array.

In some embodiments, the sensitivity and/or selectivity of the system and/or of the array of the invention to the specie of interest (e.g. VC) is enhanced by at least 10%, at least 20%, at least 50%, at least 100%, by at least 2 times, at least 3 times, at least 5 times, at least 10 times, at least 100 times, at least 1000 times, at least 10.000 times, at least 1000.000 times, including any range between, as compared to the control.

In some embodiments, the term "sensitivity" refers to the ratio between signal intensities of the system and/or of the array in response to the specie of interest (e.g. a VC, or a microbe derived VC) and in response to the control (e.g. an atmospheric gas).

In some embodiments, the sensor of the invention is configured to detect the presence and/or concentration of a VC of interest within a location. In some embodiments, the sensor of the invention is configured to analyze capacitance values obtained from a sample, to determine or predict the presence of a microbe of interest within the sample. In some embodiments, the sensor of the invention is configured to determine or predict the presence of a microbe of interest within a location, wherein the sample is associated with the location. In some embodiments, the location is selected from a gaseous sample, a liquid sample, a solid sample or any combination thereof.

In some embodiments, the sensitivity of the sensor is predetermined by the affinity and/or sensitivity of each of the sensing units within the array to a specific VC. In some embodiments, the sensor is configured to selectively predict or determine the presence of the VC of interest within a sample.

In some embodiments, the sensor is configured to selectively detect (or predict) the presence of the microbe of interest within a sample. In some embodiments, the sensor is characterized by a detection (or prediction) threshold of a microbial load (e.g. bacterial load) within a sample (e.g. a liquid sample) of at least 10 CFU/ml, at least 100 CFU/ml, at least 500 CFU/ml, at least 800 CFU/ml, at least 900 CFU/ml, or at least 1000 CFU/ml, at least 10.000 CFU/ml, at least 100.000 CFU/ml, including any range between.

Method

In another aspect, there is provided a method for determining the presence of a specie of interest in a sample, comprising:

a. exposing a sensor to a sample, wherein the sensor comprises a sensing unit, the sensing unit comprises the sensor array of the invention, or at least one capacitive sensor described herein;

b. providing electricity to the sensor, thereby obtaining a plurality of capacitance values generated by the sensor; and c. analyzing the capacitance values, thereby determining or predicting the presence and/or concentration of the specie of interest within the sample. In some embodiments, the sample is a gaseous sample. In some embodiments, the sample is a liquid sample or a solid sample. In some embodiments, the specie of interest is as described herein (e.g. VC, a microbe such as a bacterium, a fungus, a virus, etc.). In some embodiments, obtaining a plurality of capacitance values comprises receiving a plurality of capacitance signals generated by the at least one capacitive sensor of the invention, or by the sensor array of the invention (e.g. by at least one respective sensor within the array).

In another aspect, there is provided a method for predicting the presence of a microbe of interest executable by at least one processor or computing device, the method comprises the steps: a. receiving a plurality of capacitance signals generated by at least one capacitive sensor in response to exposure thereof to a sample comprising a plurality of VCs; b. extracting from said capacitance signals a least one capacitance feature for at least one respective capacitive sensor; c. introducing the at least one capacitance feature to a machine-learning (ML) model, wherein said ML model is trained to predict a presence of the microbe of interest within the sample based on said capacitance feature; and d. at an inference stage, apply said ML model to capacitance signals acquired from a sample, to predict presence of the microbe of interest within said sample; wherein at least one capacitive sensor is or comprises the sensor of the invention (e.g. having a sensing unit comprising any of the 1st sensor, the 2nd sensor, and the 3rd sensor of the invention; or any combination thereof such as in a form of the sensor array described herein). In some embodiments, at least one capacitive sensor comprises a plurality of capacitive sensors. In some embodiments, at least one capacitive sensor comprises a sensor array comprising a plurality of capacitive sensors, wherein each of the capacitive sensors comprises a sensing unit comprising carbon dots, as described herein. In some embodiments, each of the capacitive sensors comprises carbon dots characterized by substantially the same or different polarity. In some embodiments, at least one capacitive sensor comprises the sensor array of the invention.

In some embodiments, plurality of capacitance signals in step a. comprises capacitance signals generated by at least one capacitive sensor. In some embodiments, plurality of capacitance signals in step a. comprises capacitance signals generated by each of the plurality of capacitive sensors. In some embodiments, plurality of capacitance signals in step a. comprises capacitance signals generated by a plurality of sensors within the sensor array of the invention. In some embodiments, plurality of capacitance signals in step a. comprises capacitance signals generated by each of the sensors within the sensor array of the invention.

In some embodiments, providing electricity may include, providing electricity (e.g. AC, DC, or both) to at least a portion of the sensors within the array. In some embodiments, providing electricity may include, measuring at least one of, capacitance, conductivity, resistivity, impedance, current and voltage of the sensor, when the sensor is exposed to one or more VCs, wherein the one or more VCs are optionally derived from the microbe of interest.

Upon exposing the sensor to a VC of interest, the capacitance of the sensing elements changes. In some embodiments, measuring values related to the capacitance of the sensing element between the two electrodes, prior, during and after the exposure to the VC of interest is indicative to the amount and/or type of VC of interest attached/engaged with the sensing element. In some embodiments, the measured values are selected from: a temporal capacitance, time-dependent capacitance, base capacitance (e.g., background capacitance), and maximum capacitance. In some embodiments, the measured values are positive and/or negative capacitance values.

In some embodiments, the measured values (e.g. positive and/or negative capacitance values) may further be analyzed and manipulated (by a computing device) in order to further extract one or more features (e.g. capacitance feature). In some embodiments, the measured values are further processed for example, using any mathematical correlation (e.g. first time derivative), so as to extract therefrom at least one feature. In some embodiments, the extracted feature (e.g. capacitance feature) is selected from: the maximal subtracted capacitance, the difference between maximum and minimum capacitance values, the average capacitance value, the maximum capacitance value, the minimum capacitance value, the first time derivative, the second time derivative, signal to noise ratio, incline gradient, decline gradient, rise time, overshooting value relative to steady state value, oscillation decay in time and oscillation frequency. In some embodiments, the extracted feature comprise positive and/or negative values. In some embodiments, the extracted features comprise absolute values.

In some embodiments, the measured values or the extracted features are indicative to the presence, absence and/or amount of the microbe of interest within a sample. In some embodiments, the measured values and/or the extracted features may be analyzed for predicting the presence and/or amount of a microbe of interest. In some embodiments, analyzing comprises comparing the extracted features to a prestored data, for example, using any mathematical correlation and/or a calibration curve. In some embodiments, the mathematical correlation is one of: a linear correlation, a parabolic correlation, a polynomial correlation, logarithmic correlation, exponential correlation and power correlation. In some embodiments, the measured values and/or the extracted features may be analyzed using a software (e.g. PCA) or a machine learning model, thereby producing an indication of the presence and/or concentration of a microbe of interest within the sample.

In some embodiments, analyzing comprises extracting from measured values at least one capacitance feature, introducing at least one capacitance feature to a machine-learning (ML) model, wherein said ML model is trained to predict a presence of the microbe of interest within the sample based on said capacitance feature.

In some embodiments, the method further comprises an inference stage, to produce an indication of the presence and/or concentration of a microbe of interest within the sample based on the prediction.

In some embodiments, inference stage comprising applying the ML model to capacitance signals acquired from a sample, to produce an indication of the presence and/or concentration of a microbe of interest within the sample based on the prediction.

In some embodiments, analyzing comprises introducing the plurality of capacitance signals to a ML model, wherein the ML model is trained to predict a presence of a microbe of interest within the sample based on the capacitance signals; and producing an indication of the presence and/or concentration of a microbe of interest within the sample based on the prediction.

In some embodiments, analyzing comprises extracting capacitance feature from the measured capacitance values, and introducing the capacitance feature to a ML model, wherein the ML model is trained to predict a presence of a microbe of interest further based on the capacitance features, and producing an indication of the presence and/or concentration of a microbe of interest within the sample based on the prediction.

In some embodiments, extracting capacitance feature(s) comprises sampling the capacitance signal obtained from at least one respective capacitive sensor at predefined time intervals; and producing a capacitance feature representing a vector of the samples for at least one respective capacitive sensor. In some embodiments, extracting capacitance features comprises sampling the capacitance signal obtained from each of the capacitive sensors within the array at predefined time intervals; and producing a capacitance feature representing a vector of the samples for each of the capacitive sensors.

In some embodiments, extracting capacitance feature(s) further comprises calculating a maximum change in capacitance (e.g. based on the vector of the samples), and producing a capacitance feature representing the calculated maximum capacitance. In some embodiments, maximum change in capacitance is referred to the capacitance change upon exposure to a VC of interest, as compared to exposure to a control (e.g. atmospheric gas), also referred herein as baseline capacitance. In some embodiments, maximum capacitance is calculated by subtracting baseline capacitance from the maximum capacitance value obtained upon exposure of the capacitive sensor to a VC of interest.

In some embodiments, training the ML model comprises (i) receiving a plurality of training samples, the training samples are labeled according to presence of the specie of interest (e.g. a microbe); and (ii) using the labeled training samples as supervisory data for training the ML model to predict the presence and/or concentration of the microbe of interest within a sample.

In some embodiments, training samples are labeled according to presence and/or concentration of the VC of interest. In some embodiments, training samples comprise at least one capacitance feature associated with at least one respective capacitive sensor. In some embodiments, training samples comprise at least one capacitance feature associated with a specific capacitive sensor within the array and labeled according to presence or absence and/or concentration of the microbe of interest within a sample. In some embodiments, each of the training samples comprise at least one capacitance feature associated with a specific capacitive sensor within the array, and a label indicating the presence or absence and/or concentration of the VC of interest within a sample. In some embodiments, training sample comprises a plurality of capacitance features, each capacitance feature is associated with a specific capacitive sensor within the array, and the training sample is labeled according to the presence, absence, and/or concentration of one or more microbe(s) (or VC) of interest within a sample.

In some embodiments, the method is characterized by a prediction accuracy of at least 80%, at least 85%, at least 90%, at least 95%, at least 98%, including any range between.

In some embodiments, the analyzing step is executed by at least one computing device. In some embodiments, any one of steps a. to c. is executed by at least one processor. In some embodiments, at least one processor is in operable communication non-transitory computer-readable storage medium having stored thereon program instructions, the program instructions executable by the at least one hardware processor.

In some embodiments, any one of steps a. to c. is executed by at least one computing device. In some embodiments, the computing device comprises a non-transitory computer-readable storage medium having stored thereon program instructions, the program instructions executable by the at least one hardware processor.

Computing device may include a processor or controller that may be, for example, a central processing unit (CPU) processor, a chip or any suitable computing or computational device, an operating system, a memory, executable code, a storage system, input devices and output devices. Processor (or one or more controllers or processors, possibly across multiple units or devices) may be configured to carry out methods described herein, and/or to execute or act as the various modules, units, etc. More than one computing device may be included in, and one or more computing devices may act as the components of, a system according to embodiments of the invention.

Operating system may be or may include any code segment (e.g., one similar to executable code described herein) designed and/or configured to perform tasks involving coordination, scheduling, arbitration, supervising, controlling or otherwise managing operation of computing device, for example, scheduling execution of software programs or tasks or enabling software programs or other modules or units to communicate. Operating system may be a commercial operating system. It will be noted that an operating system may be an optional component, e.g., in some embodiments, a system may include a computing device that does not require or include an operating system.

Memory may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory units or storage units. Memory may be or may include a plurality of possibly different memory units. Memory may be a computer or processor non-transitory readable medium, or a computer non-transitory storage medium, e.g., a RAM. In one embodiment, a non-transitory storage medium such as memory, a hard disk drive, another storage device, etc. may store instructions or code which when executed by a processor may cause the processor to carry out methods as described herein.

Executable code may be any executable code, e.g., an application, a program, a process, task, or script. Executable code may be executed by processor or controller possibly under control of operating system. For example, executable code may be an application that may TBD as further described herein. Although, for the sake of clarity, a single item of executable code in a system according to some embodiments of the invention may include a plurality of executable code segments similar to executable code that may be loaded into memory and cause processor to carry out methods described herein.

Storage system may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data TBD may be stored in storage system and may be loaded from storage system into memory where it may be processed by processor or controller. In some embodiments, some of the components described herein may be omitted. For example, memory may be a non-volatile memory having the storage capacity of storage system. Furthermore, the storage system may be embedded or included in memory.

Input devices may be or may include any suitable input devices, components, or systems, e.g., a detachable keyboard or keypad, a mouse and the like. Output devices may include one or more (possibly detachable) displays or monitors, speakers and/or any other suitable output devices. Any applicable input/output (I/O) devices may be connected to computing device. For example, a wired or wireless network interface card (NIC), a universal serial bus (USB) device or external hard drive may be included in input devices and/or output devices. It will be recognized that any suitable number of input devices and output device may be operatively connected to computing device.

A system according to some embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units.

Cache memory may be or may include for example, a Layer 1 (L1) cache module, a Layer 2 (L2) cache module and/or a Layer 3 (e.g., L3) cache memory module, as known in the art. Cache memory may include, for example, an instruction cache memory space and/or a data cache memory space, and may be configured to cooperate with one or more processors and/or one or more processing cores to execute at least one method according to embodiments of the present invention. Cache memory may typically be implemented on the same die or chip as processor and may thus be characterized by a memory bandwidth that may be higher than that of memory and storage system.

In some embodiments, the sample comprises a plurality of gaseous species (e.g. VCs). In some embodiments, the sample comprises a plurality of VCs. In some embodiments, the sample comprises one or more gaseous species of interest (e.g. a VC derived from a microbe) and at least one additional gaseous species comprising one or more atmospheric gases (e.g. N2, O2, CO2, and/or water).

In some embodiments, the method is for selectively detecting or predicting the presence of the specie of interest within the sample. In some embodiments, the specie of interest is a VC, and wherein a concentration of the VC within a gaseous sample is at least 1 ppb, at least 10 ppb, at least 50 ppb, at least 100 ppb, at least 500 ppb, at least 1 ppm, at least 10 ppm, at least 20 ppm, at least 25 ppm, at least 30 ppm, at least 35 ppm, at least 40 ppm, at least 50 ppm, at least 60 ppm, at least 70 ppm, at least 80 ppm, at least 90 ppm, at least 100 ppm, including any range between.

In some embodiments, the specie of interest is a virus and wherein a concentration of the virus within a gaseous sample is at least $10^3$, at least $10^4$, at least $10^5$, at least $10^6$, at least $10^7$, at least $10^8$ virions/ml, including any range between.

In some embodiments, the specie of interest is a microbe (e.g. a bacterium and/or a fungus), wherein a loading of the microbe within a sample (e.g. a liquid sample, a gaseous sample, a solid sample) is at least 10 CFU/ml, at least 100 CFU/ml, at least 500 CFU/ml, at least 800 CFU/ml, at least 900 CFU/ml, or at least 1000 CFU/ml, including any range between.

In some embodiments, step a. of the method is performed under operable conditions. In some embodiments, operable conditions comprise any one of: (i) a exposure time of at least 1 second (s), at least 2s, at least 5s, at least 8s, at least 10s, at least 30s, at least 60s, at least 1.5 minute (min), at least 2 min, at least 3 min, at least 5 min, at least 10 min, or between 10 s and 10 min, between 10 s and 60s, between 1 and 2 min, between 1 and 10 min, between 2 and 5 min, between 5 and 10 min, including any range between; and (ii) an operable temperature between −10 and 100° C., between 0 and 10° C., between 0 and 25° C., between 10 and 30° C., between 10 and 20° C., between 10 and 40° C., between 20 and 30° C., between 30 and 40° C., between 40 and 50° C., including any range between. In some embodiments, operable conditions comprise a temperature between 10 and 50° C. In some embodiments, step a. of the method comprises exposure time sufficient for obtaining a stable capacitance signal (e.g. the capacitance value remains substantially unchanged, so that a first derivative of the time-dependent capacitance signal is about 0).

In some embodiments, operable conditions further comprise a pressure between 0.5 and 2 bar, a relative humidity of between 1 and 100%, between 1 and 97%, between 60 and 70%, between 10 and 100%, between 1 and 10%, between 10 and 30%, between 30 and 100%, between 40 and 100%, between 40 and 60%, between 40 and 70%, between 40 and 80%, between 60 and 80%, between 80 and 100%, including any range between.

In some embodiments, exposing comprises providing the sensor of the invention in close proximity to a location suspected of comprising the specie of interest (e.g. a microbe). In some embodiments, exposing comprises contacting the sensor with a flowing gaseous sample. In some embodiments, the flowing gaseous sample is characterized by a flow rate between 1 and 1000 cm$^3$/min, between 1 and 10 cm$^3$/min, between 10 and 20 cm$^3$/min, between 10 and 80 cm$^3$/min, between 10 and 100 cm$^3$/min, between 100 and 200 cm$^3$/min, between 200 and 500 cm$^3$/min, between 500 and 1000 cm$^3$/min, including any range between.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

General Definitions

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein, the term "substantially" refers to at least 80%, at least 85%, at least 90%, at least 92%, at least 95%, at least 96%, at least 97%, at least 98%, at least 99%, including any range or value therebetween. Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Further, all numerical values, e.g. when referring the amounts or ranges of the elements constituting the formulation are approximations which are varied (+) or (−) by up to 20%, at times by up to 10% of from the stated values. It is to be understood, even if not always explicitly stated that all numerical designations are preceded by the term "about".

The term "consisting essentially of" is used to define formulations which include the recited elements but exclude other elements that may have an essential significance on the formulation. "Consisting of" shall thus mean excluding more than trace elements of other elements. Embodiments defined by each of these transition terms are within the scope of this invention. As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

As used herein, the term "alkyl" describes an aliphatic hydrocarbon including straight chain and branched chain groups. In some embodiments, the alkyl group has 1 to 20 carbon atoms, between 1 and 10, between 1 and 5, between 5 and 10, between 10 and 15, between 15 and 20, including any range between.

In some embodiments, the alkyl encompasses a short alkyl and/or a long alkyl. In some embodiments, the alkyl has from 21 to 100 carbon atoms, or more. In the context of the present invention, a "long alkyl" is an alkyl having at least 20 carbon atoms in its main chain (the longest path of continuous covalently attached atoms). A short alkyl therefore has 20 or less (e.g. 2, 3, 4, 5, 6, 8, 10, 15, or 20) main-chain carbons. The alkyl can be substituted or unsubstituted, as defined herein.

The term "alkyl", as used herein, also encompasses saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be substituted or unsubstituted by one or more substituents, as described hereinabove.

The term "alkynyl", as defined herein, is an unsaturated alkyl having at least two carbon atoms and at least one carbon-carbon triple bond. The alkynyl may be substituted or unsubstituted by one or more substituents, as described hereinabove.

The term "cycloalkyl" describes an all-carbon monocyclic or fused ring (i.e. rings which share an adjacent pair of carbon atoms) group where one or more of the rings does not have a completely conjugated pi-electron system. The cycloalkyl group may be substituted or unsubstituted, as indicated herein.

The term "aryl" describes an all-carbon monocyclic or fused-ring polycyclic (i.e. rings which share adjacent pairs of carbon atoms) groups having a completely conjugated pi-electron system. The aryl group may be substituted or unsubstituted, as indicated herein.

The term "alkoxy" describes both an O-alkyl and an —O-cycloalkyl group, as defined herein. The term "aryloxy" describes an —O-aryl, as defined herein.

Each of the alkyl, cycloalkyl and aryl groups in the general formulas herein may be substituted by one or more substituents, whereby each substituent group can independently be, for example, halide, alkyl, alkoxy, cycloalkyl, nitro, amino, hydroxyl, thiol, thioalkoxy, carboxy, amide, aryl and aryloxy, depending on the substituted group and its position in the molecule. Additional substituents are also contemplated.

The term "halide", "halogen" or "halo" describes fluorine, chlorine, bromine or iodine. The term "haloalkyl" describes an alkyl group as defined herein, further substituted by one or more halide(s). The term "haloalkoxy" describes an alkoxy group as defined herein, further substituted by one or more halide(s). The term "hydroxyl" or "hydroxy" describes a —OH group. The term "mercapto" or "thiol" describes a —SH group. The term "thioalkoxy" describes both an —S-alkyl group, and a —S-cycloalkyl group, as defined herein. The term "thioaryloxy" describes both an —S-aryl and a —S-heteroaryl group, as defined herein. The term "amino" describes a —NR'R" group, or a salt thereof, with R' and R" as described herein.

The term "heterocyclyl" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyran, morpholino and the like.

The term "carboxy" describes a —C(O)OR' group, or a carboxylate salt thereof, where R' is hydrogen, alkyl, cycloalkyl, alkenyl, aryl, heteroaryl (e.g. optionally bonded through a ring carbon, or through a heteroatom) or heterocyclyl (e.g. optionally bonded through a ring carbon, or through a heteroatom) as defined herein.

In some embodiments, R' and R" are the same or different, wherein each of R' and R" is independently selected from hydrogen, alkyl, cycloalkyl, alkenyl, aryl, heteroaryl (e.g. optionally bonded through a ring carbon, or through a heteroatom) or heterocyclyl (e.g. optionally bonded through a ring carbon, or through a heteroatom) as defined herein.

The term "carbonyl" describes a —C(O)R' group, where R' is as defined hereinabove. The above-terms also encompass thio-derivatives thereof (thiocarboxy and thiocarbonyl).

The term "thiocarbonyl" describes a —C(S)R' group, where R' is as defined hereinabove. A "thiocarboxy" group describes a —C(S)OR' group, where R' is as defined herein. A "sulfinyl" group describes an —S(O)R' group, where R' is as defined herein. A "sulfonyl" or "sulfonate" group describes an —S(O)2R' group, where R' is as defined herein.

A "carbamyl" or "carbamate" group describes an —OC(O)NR'R" group, where R' is as defined herein and R" is as defined for R'. A "nitro" group refers to a —NO2 group. The term "amide" as used herein encompasses C-amide and N-amide. The term "C-amide" describes a —C(O)NR'R" end group or a —C(O)NR'-linking group, as these phrases are defined hereinabove, where R' and R" are as defined herein. The term "N-amide" describes a —NR"C(O)R' end group or a —NR'C(O)— linking group, as these phrases are defined hereinabove, where R' and R" are as defined herein.

A "cyano" or "nitrile" group refers to a —CN group. The term "azo" or "diazo" describes an —N=NR' end group or an —N=N— linking group, as these phrases are defined hereinabove, with R' as defined hereinabove. The term "guanidine" describes a —R'NC(N)NR"R'" end group or a —R'NC(N) NR"— linking group, as these phrases are defined hereinabove, where R', R" and R" are as defined herein. As used herein, the term "azide" refers to a —N3 group. The term "sulfonamide" refers to a —S(O)2NR'R" group, with R' and R" as defined herein.

The term "phosphonyl" or "phosphonate" describes an —OP(O)—(OR')2 group, with R' as defined hereinabove. The term "phosphinyl" describes a —PR'R" group, with R' and R" as defined hereinabove. The term "alkylaryl" describes an alkyl, as defined herein, which substituted by an aryl, as described herein. An exemplary alkylaryl is benzyl.

The term "heteroaryl" describes a monocyclic or fused ring (i.e. rings which share an adjacent pair of atoms) group having in the ring(s) one or more atoms, such as, for example, nitrogen, oxygen and sulfur and, in addition, having a completely conjugated pi-electron system. As used herein, the term "heteroaryl" refers to an aromatic ring in which at least one atom forming the aromatic ring is a heteroatom. Heteroaryl rings can be foamed by three, four, five, six, seven, eight, nine and more than nine atoms. Heteroaryl groups can be optionally substituted. Examples of heteroaryl groups include, but are not limited to, aromatic C3-8 heterocyclic groups containing one oxygen or sulfur atom, or two oxygen atoms, or two sulfur atoms or up to four nitrogen atoms, or a combination of one oxygen or sulfur atom and up to two nitrogen atoms, and their substituted as well as benzo- and pyrido-fused derivatives, for example, connected via one of the ring-forming carbon atoms. In certain embodiments, heteroaryl is selected from among oxazolyl, isoxazolyl, oxadiazolyl, thiazolyl, isothiazolyl, pyridinyl, pyridazinyl, pyrimidinal, pyrazinyl, indolyl, benzimidazolyl, quinolinyl, isoquinolinyl, quinazolinyl or quinoxalinyl.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.
Materials and Methods
Materials
Urea, p-phenylenediamine, citric acid, cobalt chloride hexahydrate (CoCl2·6H2O), Lithium chloride (LiCl$_2$), Magnesium chloride (MgCl$_2$), Potassium carbonate (K$_2$CO$_3$), Sodium chloride (NaCl), Potassium chloride (KCl), Potassium sulfate ($K_2SO_4$), toluene, n-hexane, dimethyl formamide, ethyl acetate, methanol, and ammonium were purchased from Sigma Aldrich. Luria—Bertani (LB) agar was purchased from Pronadisa (Spain). Interdigitated gold electrodes (Dimensions: 10×6×0.75 mm; glass substrate; Insulating layer: EPON SU8 resin; electrode material: Au; electrode thickness: 150 nm; microelectrode with: 10 microelectrode gap: 10 μm; number of fingers: 90 pairs) were purchased from MicruX Technologies (Oviedo, Spain). The bacteria used in the studies were *Escherichia coli* DH10B wild type, *Pseudomonas aeruginosa* PAO1 wild type, *Bacillus subtilis* PY79, and *Staphylococcus aureus* wild type strains (generously provided by Prof Ariel Kushmaro, Ben Gurion University). Ultrapure distilled water (Millipore) was used in all experiments.

Synthesis of C-dots

Synthesis of the C-dots employed a modified reported procedure for construction of multiple polarity C-dots. Briefly, 0.2 g of urea, 0.1 g of citric acid and 0.2 g of p-phenylenediamine were dissolved in 50 mL of distilled water. The solution was subsequently heated at 180° C. for 10 h in a Teflon autoclave. Following cooling to room temperature, the suspension was centrifuged twice for 5 min at 11,000 rpm for discarding larger aggregates. The resultant solution was purified via silica column chromatography using a mixture of Toluene and methanol as the eluent. After collecting the different fluorescent C-dots, exhibiting different colors/polarities, the C-dots were dispersed in water prior to electrode deposition.

C-dot-IDE Sensor Construction

To prepare the C-dot-IDE capacitive electrodes the inventors utilized a recently developed protocol. Briefly, C-dot suspensions (15 μL) were drop-casted on the interdigitated electrodes (IDEs) and left to dry overnight under room temperature. The resultant electrodes were kept at room temperature in $N_2$ environment prior to measurements.

Characterization

Atomic force microscopy (AFM): AFM images were collected in AC-mode (tapping mode), with a Cypher-ES, asylum research (oxford instrument) model, using an AC 160 TS (Olympus) probe, with a tip radius of 9 nm and a force constant of approximately 26 Nm-1. The C-dots-IDE sample and a control IDE sample were measured at the capacitor detecting area between the gold IDE electrodes.

Water contact angle (WCA): Carbon dot hydrophobicity was determined using a contact angle meter (Attension Theta Lite, Biolin Scientific, Finland). The contact angles were measured by 5 μL water deposition on the surface of deposited C-dot samples and a control sample. The average WCA was calculated.

Vapor Sensing

The gas apparatus setup for vapor generation and sensing (FIG. 1), was based on a recent publication. Briefly, for the vapor sensing experiments, the inventors used an inert gas carrier—dry nitrogen, split into two components: one carrier flow bubbling through the volatile organic compounds (n-Hexane, toluene, dimethylformamide, Ethyl acetate, methanol, ammonium) at variable rates. The C-dot-IDE electrodes were placed in the detection chamber, connected to an LCR meter (Keysight Technologies, E4980AL Precision LCR Meter), in order to detect capacitance changes. Vapor concentrations were determined by gas chromatography-mass spectrometry (Agilent 7890B/5977A Series Gas Chromatograph/Mass Selective Detector); with a range of 5 to 95 ppmv. In order to calibrate the vapor concentration, the inventors used a mass flow controller (MFC) in order to determine the exact concentrations in correlation with the GC-MS calibration curves. For producing different relative humidity (RH) environments, the inventors bubbled saturated aqueous solutions of different salts (potassium carbonate, cobalt chloride and potassium sulfate, for generating RH=43%, 64% and 97%, respectively) in a closed glass vessel, under a constant temperature (25 Co). RH values were confirmed using a standard humidity sensor (TH 210, KIMO, Instruments, France).

All gas sensing measurements were conducted at 64% RH. Prior the examination each of the electrodes were saturated at 64% RH.

Capacitive measurements were performed using 35 ppmv gas concentrations under standard conditions at room temperature upon exposure of the C-dot-IDE electrodes to the target vapor. Capacitance values were recorded after producing a clear baseline with exposure to 64% RH, collecting the data every 1.3 sec. The changes in capacitance were recorded upon addition to different vapor analytes through generation at specific flows (calibrated to the desired gas concentration). After reaching saturated capacitance values gas molecules were removed by flushing with $N_2$ gas passing through an aqueous $CoCl_2$ saturated solution (producing RH=64% vapor).

Bacterial Growth and Vapor Sensing

The four bacterial strains were cultured in Luria-Bertani (LB) medium at 37 Co and 28 Co for gram-negative and gram-positive bacteria, respectively. Single bacterial colonies from LB agar plates were inoculated into 10 mL of LB broth and maintained at the proper temperature (37 Co or 28 Co) for 12 h in a shaking incubator (220 rpm). The concentration of bacteria in the medium was obtained by measuring the optical density at 600 nm (OD 600). When the OD 600 reached 0.5, 50 μl from the bacterial culture was grown on the solid LB agar in 20 ml vail that kept under adjusted environment using a water bath. maintained at a constant temperature. Bacterial gas emissions were monitored by placing the electrodes 2.5 cm above the sample. The initial capacitance was taken, proceeding with measuring the capacitance change in different time points.

Data Analysis

The IDE capacitance value is defined as:

$$C = \eta \varepsilon_0 \varepsilon_r lt/d$$

C is capacitance in farads (F), 11 is the number of fingers, ε0 is the permittivity of free space ($\varepsilon_0$=8.854×10–12 F/m), $\varepsilon_r$ is the relative permittivity, usually known as the dielectric constant, 1 is the length of interdigital electrodes, t is the thickness of interdigital electrodes and d is the distance between the electrodes. The IDEs capacitive sensing is lean on modulations of the dielectric constant of the material placed upon the electrode. The dielectric constant is modulated with absorption of different gas analytes, causing capacitance changes effect.

The capacitance response of the sensors—ΔC—was defined as Cgas—C0, where Cgas and C0 are, the saturated capacitance value after addition of the gas analyte measured under the same humidity (64% RH) in a specific concentration and the capacitance baseline value measured at 64% RH, respectively. The baseline was adjusted as 0 nF in order to compare between the electrodes (as all electrode presented a high initial capacitance value in nF units).

Gas Chromatography-Mass Spectrometry (GC-MS)

GC-MS was used to detect the analyte concertation at a specific flow rate (controlled with the mass flow controller). The unit's Agilent 7890B GC was connected to an Agilent 5977A single-quadrupole mass-selective detector. The instrument is equipped with a 100-vial autosampler, an NISTO2 MS and an ACD Labs MS Manager (software package for mass-spectra interpretation and structure elucidation). Column type of (35% phenyl methyl siloxane for MS; length 30 m; 0.25 mm, I.D. & 0.25 µm film thickness; temperature was programmed at 25 C.° for 1 min to 70 C.° at 3 C°/min to 280 C.° at 10 C°/min. Transfer line temperature 280 C.° & Total run time is 37 min. The carrier (Helium) gas flow rate of 2 ml/min were applied. Sample analysis was carried out by solution (calibration) and vapor injecting (Splitless) 20 µl sample size into the GC.

Concentration determination—For each analyte, the inventors created a calibration curve with a known concentration (5 ppmv-95 ppmv) dissolved in a suitable organic solvent. (High purity solvents were used in order to prepare the standard solutions (toluene, n-hexane, dimethyl formamide, ethyl acetate, butanol, and ammonium with ≥99% purity). All standards were prepared in methanol solution, except of the methanol standard which was prepared in acetonitrile. To construct the calibration curves, the results where quantified based on peak area using the extracted ion method performed by Masshunter qualitative analysis software. The target peak assignments were confirmed with the pure materials. Analyte vapors were measured in different flow rates and examined using GC-MS in injection mode. The flow rates were then adjusted to produce 35 ppmv gas concentrations for each examined analyte.

Impedance Measurements

Complex impedance spectra were conducted between 1 Hz-100 kHz for C-dot-IDEs kept at different humidity values by using a LCR meter (Keysight Technologies, E4980AL Precision LCR Meter) with testing voltage of 1V at room temperature. To set up different RH environments, saturated aqueous of K2CO3, CoCl2, K2SO4 were placed in airtight glass vessels at a temperature of 25° C., which yielded atmospheres with RHs 43%, 64%, 97%. each electrode was placed inside the detection chamber, connected to an LCR meter measuring Z' and Z", the real and imaginary value of the impedance respectively, using the follow impedance equation:

$$Z = Z' + Z'' = R + \frac{1}{i \cdot 2\pi f \cdot C} = R - \frac{i}{2\pi f \cdot C}$$

where R is the resistance, f is the frequency and C is the capacitance.

Machine learning (ML)

In order to report an unbiased and reliable estimate for the ML model accuracy the inventors used the leave-one-out cross-validation procedure, as recommended for evaluating chemometric models in small sample sizes. The leave-one-out procedure is performed by training the model N times, where N is the number of different sensors' readings. In each training repetition, the inventors trained the model with all readings except for one that is used to evaluate its predictive performance. Notably, each available reading is used only once for evaluating the model. The leave-one-out cross-validation procedure allows us to use the largest available training set (N−1) and achieve an unbiased estimate of the accuracy.

Example 1

Figure 1:
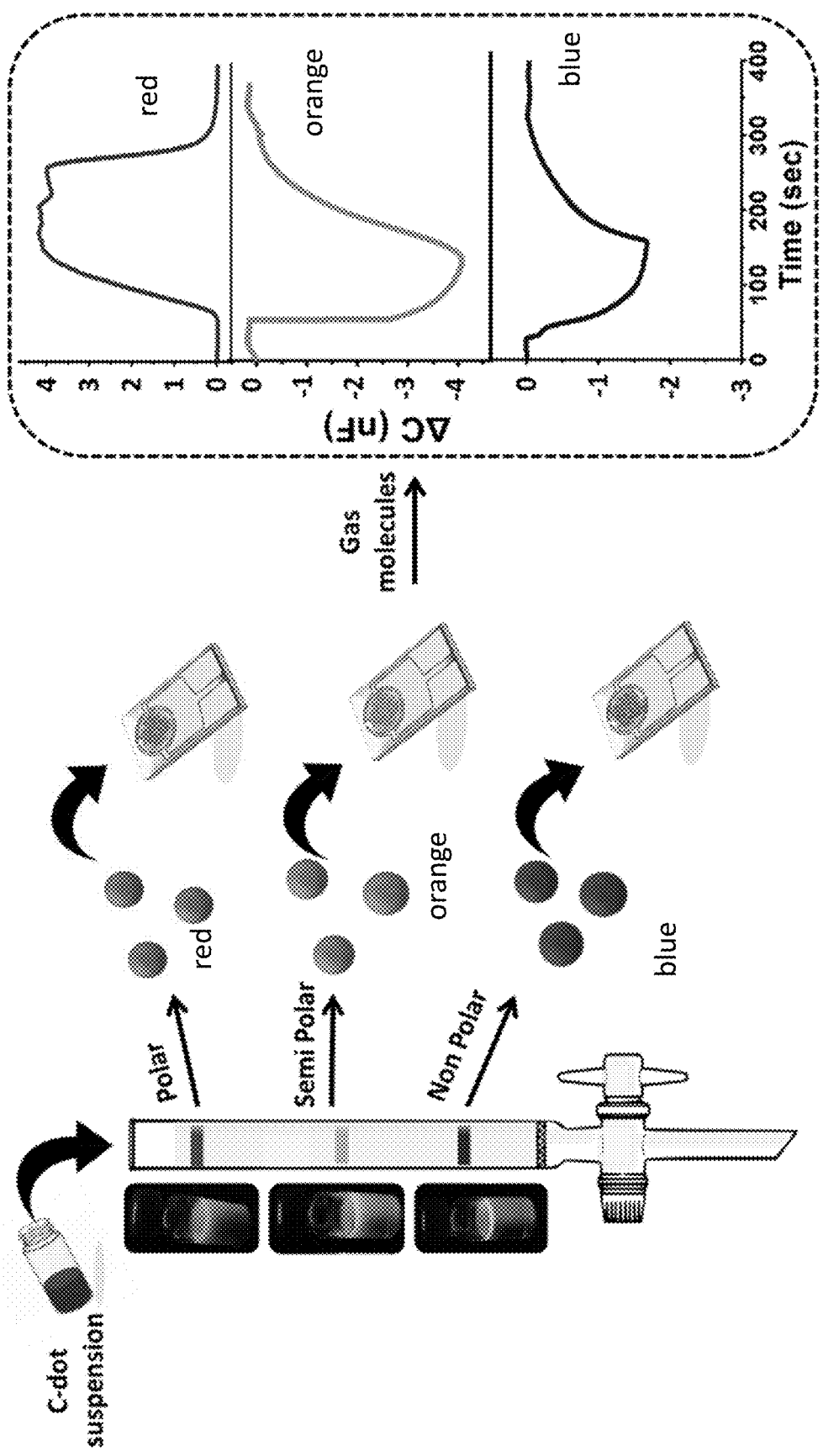
FIG. 1 includes a scheme showing a non-limiting fabrication of the carbon-dot-interdigitated electrode capacitive vapor sensors. C-dots are separated according to color/polarity using liquid chromatography and deposited on commercially available IDEs.

The objective of this study was to design a simple, sensitive artificial nose for continuous monitoring of vapor molecules. FIG. 1 illustrates the design of the C-dot-based capacitive vapor sensor. C-dots exhibiting different polarities were synthesized from para-phenyl diamine, urea, and citric acid as the carbonaceous precursors, and separated according to polarity by liquid chromatography. In a non-limiting example, the blue C-dots display lower abundance of polar units on their surface, while the orange C-dots and more so the red C-dots contained higher concentrations of polar residues such as hydroxyl, carboxyl and amines (the distinct colors of the chromatography-separated C-dot solutions are shown in FIG. 1). The isolated C-dots, exhibiting different polarities and colors, were each drop-casted on commercially available interdigitated electrodes (IDEs; FIG. 1, middle). As outlined in FIG. 1, right, the capacitance measured by the C-dot-IDEs were altered upon exposure of the C-dot-IDEs to gas molecules. Importantly, the extent and direction (e.g. increase or decrease) of the capacitance changes were significantly different for each C-dot-IDE electrode, depending upon the polarities of both the C-dots species deposited as well as the gas molecules detected.

FIG. 2 depicts characterization of the C-dot-IDE system, particularly examining incorporation of the C-dots upon the electrode surface and their effects. The atomic force microscopy (AFM) images in FIG. 2A attest to deposition of ubiquitous C-dots at the space between the gold fingers comprising the interdigitated "comb". The diameters of the C-dots were on the order of 5 nm, as apparent in the AFM height profile in FIG. 2A, right.

FIG. 2B presents the water contact angle (WCA) of IDEs coated with the different C-dots, confirming the significant effect of C-dot polarity upon the macroscopic IDE surface properties. Indeed, FIG. 2B attests to a direct relationship between surface polarity of the C-dots and the degree of hydrophobicity of the electrode. For example, the WCA of an electrode coated with red C-dots, which exhibit the highest polarity among C-dots employed, decreased from 300 to 230 (FIG. 2B), reflecting the abundant polar units upon the C-dots. In comparison, the WCA increased to 580 and 740 in the IDEs coated with orange C-dots and blue C-dots, respectively, accounting for the lower polarities of these C-dots which affect more pronounced electrode hydrophobicity.

FIG. 3 depicts the capacitance profiles of the C-dot-IDEs measured upon exposure to different gases. FIG. 3A illustrates the capacitance curves recorded for the three C-dot-IDEs sensors upon exposure to toluene (representing a non-polar gas molecule), dimethylformamide (DMF, exhibiting medium polarity) and ammonia (high polarity molecule). The C-dot-IDEs were initially exposed to 64% humidity (at room temperature), resulting in adsorption and equilibration of water molecules onto the C-dot-coated electrode surface. FIG. 3A depicts the capacitance changes induced by the three gas molecules in each electrode. Both toluene and dimethylformamide (DMF) induced lowering of the capacitance, albeit by different degrees depending upon the C-dots deposited. In contrast, ammonia gave rise to higher capacitance in all three electrodes (FIG. 3A). Importantly, the capacitance curves in FIG. 3A underscore rapid capacitance response, at around 50 sec (depending on gas species). Such capacitance response is among the fastest recorded for capacitive vapor sensors and accounts for rapid adsorption of gas molecules onto the electrode surface. Furthermore, FIG. 3A also demonstrates that purging the C-dot-IDE with air (at 64% humidity) resurrected the initial capacitance values facilitating reusability of C-dot-IDE sensor for multiple measurements.

FIG. 3B presents the capacitive dose-response graphs recorded upon exposure of the red C-dot-IDE to different concentrations of NH3 and DMF vapors [the concentrations were determined by gas chromatography-mass spectrometry (GC-MS)]. The dose-response analysis in FIG. 3Bi reveals two linear regions, one between 0 and 50 ppmv and another linearity between 50 and 100 ppmv. The two linear capacitive response domains likely correspond to different mechanisms of ammonia adsorption onto the C-dot-IDE surface. Distinct NH3 concentration-dependent surface-adsorption regimes have been reported, indicating NH3 monolayer formation in low concentrations, multilayer assembly in higher ammonia concentrations. In the case of exposure of the red-C-dot-IDE sensor to DMF, a single linear dependence was apparent (FIG. 3Bii) likely reflecting a single adsorption process of the DMF molecules. Note the negative capacitance change recorded, accounting for the lower dielectric constant of the DMF gas molecules adsorbed on the electrode surface. Both dose-response curves in FIG. 3B demonstrate a detection threshold of around 5 ppmv, underlying an excellent sensitivity of the C-dot-IDE platform.

The bar diagram in FIG. 3C summarizes the capacitance response signals induced in all three electrodes by gas target molecules spanning a wide polarity range (concentrations of all gases were 35 ppmv). The diagram in FIG. 3C reveals significant variations of capacitance responses for each gas target (i.e. capacitive "fingerprints"), dependent both upon the polarity of the gas molecules as well as the polarity of C-dots deposited on the electrode surface. For example, the sensor comprising blue C-dots exhibited significant negative capacitance signals upon addition of the relatively non-polar gases ethyl-acetate, toluene or hexane, while the more polar gas molecules, such as ammonia, methanol or butanol affected less capacitance decreases (or a capacitance increase in the case of ammonia).

Importantly, the capacitive response data in FIG. 3C indicate that correlation between the polarities of gas molecules and the electrode-deposited C-dots constitutes a core determinant affecting both the magnitude of the sensor signals and their direction (negative/positive). For example, while FIG. 3C reveals that the IDE sensor coated with the non-polar blue C-dots displayed the most pronounced (negative) capacitance signals in the case of the non-polar gases toluene and hexane, the highly polar red-C-dot-IDE electrode exhibited the highest (and positive) capacitance changes upon exposure to the polar gases ammonia and methanol. Interestingly, the orange-C-dot-IDE sensor electrode featured the highest sensitivity (e.g. most pronounced capacitance decrease) towards ethyl acetate and DMF, which exhibit intermediate polarity among the gases examined. While recent studies have reported polarity-based modulation of C-dots' optical properties, the data in FIG. 3 is the first example of macroscopic, cooperative effect of polarity-dependent transformations occurring in C-dot systems.

The capacitive response profiles of the gas molecules using the C-dot-IDE electrode systems outlined in FIG. 3 can be employed for selective detection of gas targets through a machine-learning (ML)-based detection model, demonstrating applicability of the sensors an effective "artificial nose" (Table 1). In a non-limiting example, in the ML strategy employed, the capacitance change values obtained for the different electrodes were used as input attributes for training a model designed to identify which gas molecule induces a given sensors' reading. In a non-limiting example, instead of training a dedicated binary model for each gas separately, the gas identification schemes the inventors implemented is formulated as a multi-label classification task. With this model, a single sensors' reading may be simultaneously assigned to many labels (gases). In particular, a multi-label classifier can better capture the statistical interactions among electrodes' values in the presence of gas mixtures. In a non-limiting example, the inventors employed a Rakel++ algorithm that solves a multi-label classification task by constructing an ensemble of models, each of which considers a random subset of gases. For training every base model the inventors used the "random forest" algorithm, that train many decision trees independently while injecting randomness to ensure diversity among the trees. The inventors focused on a random forest because this approach fits well to a relatively limited number of readings (as is the case here), excluding application of other machine-learning methods (such as deep learning) that require much larger training sets.

TABLE 1

Predictive accuracy of the machine learning (ML) model

| Gas tested | Accuracy (Correctly Classified Instances) | AUC (Area under the ROC curve) |
|---|---|---|
| Ammonia | 100% | 1.00 |
| BuOH | 80.5% | 0.92 |
| DMF | 87.5% | 0.95 |
| EtAc | 87.8% | 0.73 |
| Hexane | 78.05% | 0.83 |
| MeOH | 97.6% | 0.99 |
| Toluene | 90.2% | 0.92 |
| Average | 88.7% | 0.87 |

| Gas mixture tested | Subset Accuracy |
|---|---|
| Hexane + Toluene | 85% |
| BuOH + DMF | 83% |
| Hexane + Toluene + BuOH + DMF | 81% |
| Average | 83% |

Accuracy: Percentage of correct predictions (both "true positive" and "true negative") out of the total readings. AUC: Area under the receiver operating characteristic (ROC) curve, accounting for the quality of prediction of "true positive" vs "false positive" readings. The upper part of the table presents the predictive performance of the ML model for each gas individually, and the lower part shows the subset accuracy of correctly detecting different gas mixtures.

Table 1 underscores the excellent predictive performance of the ML-based model applied here (details of application of the ML model to the capacitive response data are provided in the Experimental Section). Specifically, Table 1 indicates that the "accuracy" values obtained (corresponding to the proportion of correct detections, both "true positives" and "true negatives", among all examined cases) were almost all above 80%, with an average approaching 90%, indicating relatively accurate prediction of the gas molecule detected. Similarly, the AUCs, areas under the receiver operating characteristic (ROC) curves which reflect the trade-off between the true positive rate and false positive rate were on the order of 0.9 (average of 0.87), indicating satisfactory "true positive" predictions even in stringent thresholds.

Furthermore, the fabricated C-dot-IDE electrodes were subjected to a stability test. The stability test has been performed by recording capacitive change signals upon adsorption and desorption of DMF at a concentration of 35 ppmv. Triplicates of red C-dot-IDE electrode were tested at several time points from the day of preparation (0 day), and after 1, 5, 10, 15, and 30 days. Even after 30 days capacitance result exhibits excellent stability and repeatability. All electrodes were kept under the same temperature conditions in $N_2$ environment.

gases (gas concentrations were 35 ppmv). FIG. 4B reveals a close relationship between the polarities of gas molecules and impedance changes. In a non-limiting example, exposure to DMF, BuOH and toluene gave rise to significantly more pronounced Rct (e.g. wider semicircles, the Rct values extracted from the Nyquist plots are outlined in Table S1).

TABLE S1

Sensors response and recovery time values of all electrodes for the analytes presented in FIG. 2A

| Analytes | Blue C-dot | | Orange C-dot | | Red C-dot | |
| --- | --- | --- | --- | --- | --- | --- |
| | Response time (s) | Recovery time (s) | Response time (s) | Recovery time (s) | Response time (s) | Recovery time (s) |
| Hexane | 55 | 145 | 48 | 223 | 87 | 161 |
| Toluene | 83 | 144 | 86 | 113 | 173 | 211 |
| Ammonia | 30 | 66 | 32 | 63 | 86 | 107 |

Table 1 further demonstrates that the ML model utilizing the C-dot-IDE capacitive signals can also accurately predict gas mixture compositions. To account for this aspect, the inventors evaluated the "subset accuracy"—a very strict evaluation parameter requiring that the predicted set of gases in a mixture be an exact match of the true set of gases (for example, detecting only some of the gases, or detecting extra gases are considered to be a misdetection). Importantly, as shown in Table 1, the ML model reached a relatively high average subset accuracy of 83%. Such a predictive performance underscores the capability of the C-dot-IDE platform to detect individual gas targets in mixtures. Overall, the ML analysis outlined in Table 1 underscores an excellent predictive performance, on par or better than reported ML applications in chemometrics.

To decipher the mechanistic basis for the remarkable selectivity and sensitivity of the C-dot-IDE capacitive gas sensor the inventors carried out an electrochemical impedance spectroscopy analysis (FIG. 4). In general, impedance measured in capacitive systems strongly depends upon charge transfer processes occurring at the electrode-vapor interface. As such, impedance spectroscopy exhibits pronounced sensitivity to electrode surface properties and illuminates surface properties and processes occurring through adsorption of gas molecules.[44] FIG. 3A depicts the Nyquist plots recorded for the orange-C-dot-IDE in different humidity conditions (i.e. different RH values). The semicircle diameters in the Nyquist plots depicted in FIG. 4A account for the charge transfer resistance (Rct) at the electrode surface. Importantly, FIG. 4A demonstrates that placing the C-dot-IDE in higher humidity environments gave rise to lower Rct.

The close relationship between humidity and charge transfer resistance reflects affinity of water molecules onto the electrode surface, particularly docking of the adsorbed water molecules upon the polar residues (primarily OH and COOH units) on the C-dots' surface. As such, higher concentrations of physically adsorbed water molecules upon the C-dot-IDE surface would give rise to smaller Rct due to the conductive nature of water molecules. Indeed, an almost linear relationship between the real and imaginary impedance values (i.e. diminished semicircle corresponding to very small Rct) was apparent in the case of RH=97%, ascribed to the substantial concentration of water molecules adsorbed on the C-dot-IDE surface.

FIG. 4B presents the Nyquist plots recorded at RH=64% for the orange C-dot-IDE following exposure to different Table S1 represents response and recovery time in seconds based on the capacitance changes curves induced by the three gas molecules in each electrode. Response time was considered to be the gas saturation time reviling a constant capacitive signal. Recovery time is consisting with the time that took for the capacitive signal to go back to the baseline capacitive signal from the point of espousing to 64% RH.

The mechanistic picture emerging from the impedance spectroscopy data in FIG. 4B underscores substitution of electrode surface-adsorbed water by the vapor molecules. In a non-limiting example, two factors shape the capacitance changes and their magnitude. When adsorbed water molecules are substituted by gases exhibiting lower polarities and lower dielectric constants than water—DMF, BuOH and toluene—Rct decreased (ascribed to the presence of less-polar adsorbed molecules) and in parallel the capacitance became more negative (accounting for the lower dielectric constants of the adsorbed molecular layers). Crucially, the extent of water substitution in the C-dot-IDEs depends upon "matching" between the polarity of the electrode-displayed C-dots and vapor molecules. For example, the Rct (FIG. 4B) and capacitance change (FIG. 2C) induced by DMF in the case of the orange-C-dot-IDE sensor were much more pronounced than toluene although DMF exhibits higher polarity and larger dielectric constant then toluene. This result is due to better matching between the polarities of DMF and orange C-dots.

In contrast to the relatively low polarity DMF, BuOH and toluene, ammonia is highly polar and gave rise to a lower Rct (lower-diameter semicircle, FIG. 4B, black curve). The enhanced conductance in this case is ascribed to formation of an ammonia layer physically adsorbed upon the water layer. Such a "double layer" ammonia adsorption, previously reported on metal surfaces, is due to the extensive hydrogen bonding between the adsorbed ammonia molecules and deposited water. This phenomenon also accounts to the more pronounced dielectric constant and concomitant higher capacitance recorded (i.e. FIG. 3C).

FIG. 5 demonstrates utilization of the C-dot-IDE artificial nose for both continuous monitoring of bacterial proliferation as well as identification of bacterial species. FIG. 5A illustrates the experimental setup. A C-dot-IDE sensor was placed short distance above a surface (solid agar matrix) on which bacteria were allowed to proliferate. Capacitive signals induced by volatile compounds released by the growing bacteria were continuously monitored, yielding a real-time inline profile of bacterially emitted gas molecules. Importantly, while the scheme in FIG. 5A shows a single C-dot-IDE sensor, an array comprising different C-dot species (i.e. blue C-dot-IDE, orange C-dot-IDE, red C-dot-IDE) can be employed simultaneously, serving as an artificial nose for bacterial detection.

Figure 5A:
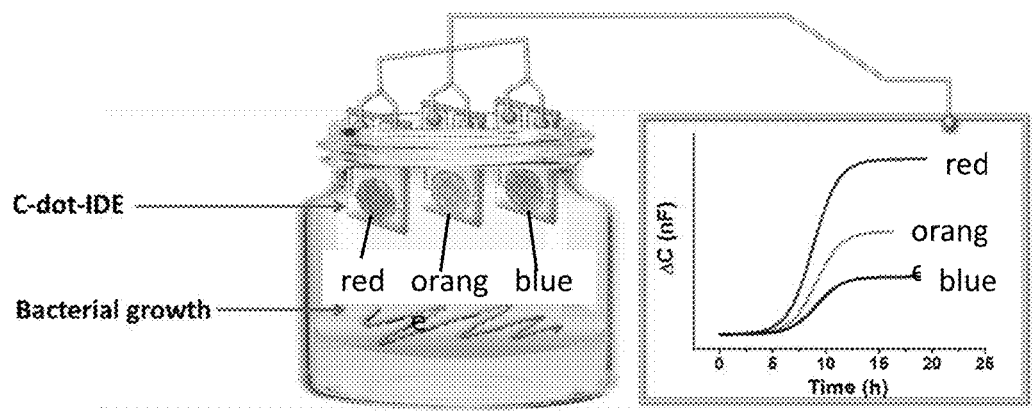
Figure 5B:
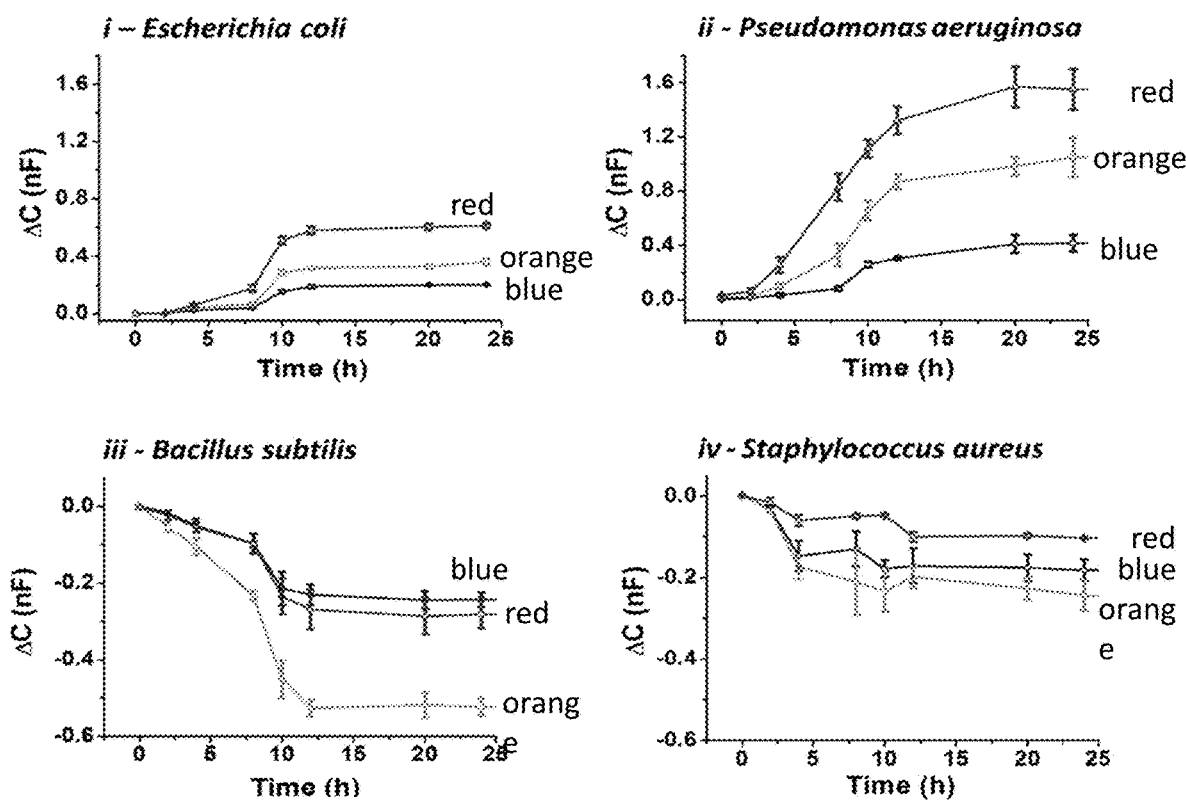

FIG. 5B presents capacitance response curves induced by volatile compounds emitted by different bacterial stains through using the C-dot-IDE artificial nose. The graphs in FIG. 5B show the capacitance increase or decrease induced in the three C-dot-IDE sensors (comprising blue C-dots, orange C-dots and red C-dots, respectively) upon exposure to the same quantity of bacterial cells initially placed upon an agar surface underneath the sensor electrodes (e.g. FIG. 5A). The experimental data in FIG. 5B reveal significant differences in the capacitive signals generated by each bacterial species. In a non-limiting example, $E.$ $coli$ and $P.$ $aeruginosa$ gave rise to an increase in capacitance in the three C-dot-IDE sensing platforms albeit by different degrees, while $B.$ $subtilis$ and $S.$ $aureus$ proliferation induced reduction in the recorded capacitance. The different capacitance profiles are ascribed to the distinct compositions of volatile compounds, including amines, sulfides, and hydrocarbons emitted by different bacterial species. In particular, the graphs in FIG. 5B reveal pronounced difference between the capacitive response of Gram-negative bacteria ($E.$ $coli$ and $P.$ $aeruginosa$) and Gram-positive bacteria ($B.$ $subtilis$ and $S.$ $aureus$), reflecting the high concentration of volatile polar molecules emitted by Gram-negative bacteria in comparison with the more abundant non-polar gas compounds secreted by Gram-positive bacterial cells. Notably, the time-dependent capacitance curves in FIG. 5B and FIG. 5E closely trace the bacterial growth curves determined through a conventional turbidity assay.

Figure 5C:
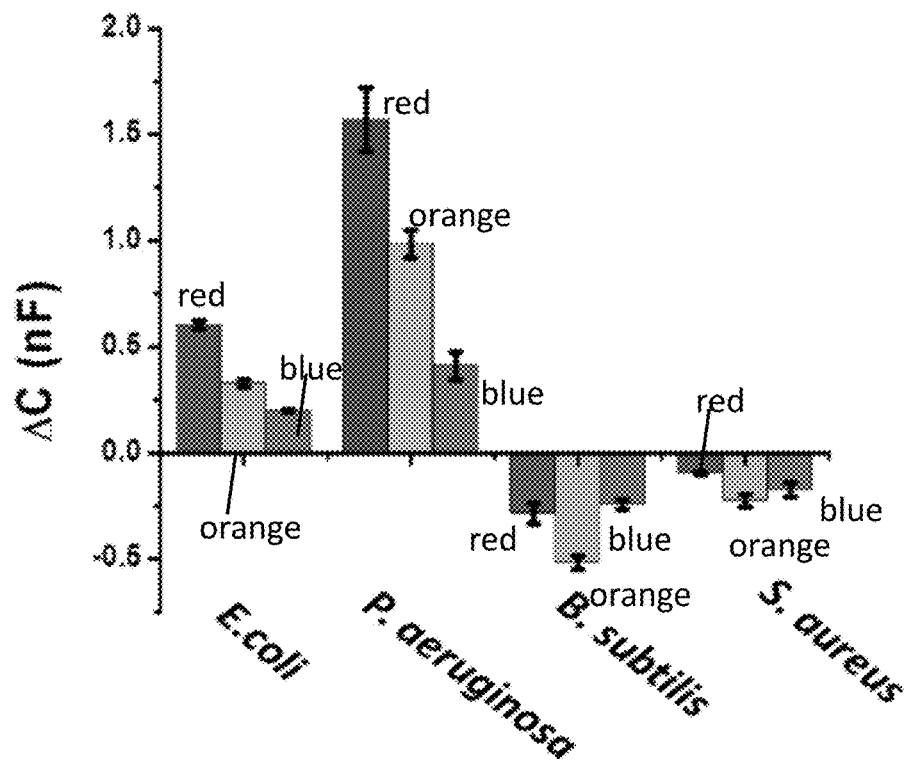

The bar diagram in FIG. 5C, summarizing the capacitance transformations recorded after a 20-hour exposure of the C-dot-IDEs to proliferating bacteria inoculated at the same initial concentration, indicates that the C-dot-IDE artificial nose can distinguish each bacterial species through its "capacitive fingerprint" generated by the three C-dot-IDE electrodes (blue, orange, red; FIG. 5C). In a non-limiting example, $P.$ $aeruginosa$ gave rise to high positive capacitive response in the three electrodes, producing a capacitance change ratio of 1.00:0.63:0.26 (red C-dot-IDE: orange C-dot-IDE: blue C-dot-IDE). $E.$ $coli$, in comparison, affected much lower capacitance change and also a different signal ratio of 1.00:0.54:0.33. FIG. 5C reveals that a significant difference in capacitive responses is similarly apparent between the more negative capacitive changes induced by $B.$ $subtilis$ (capacitance change ratio of 0.55:1.00:0.47; red C-dot-IDE: orange C-dot-IDE: blue C-dot-IDE] compared to $S.$ $aureus$ [capacitance change ratio of 0.43:1.00:0.77.

Figure 5D:
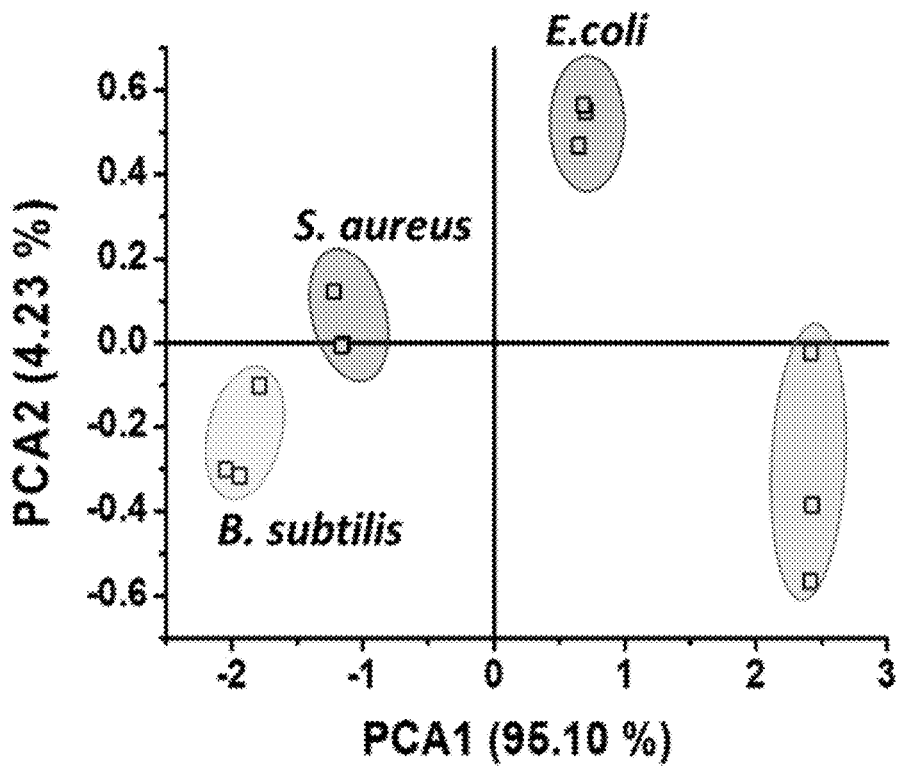
Figure 5E:
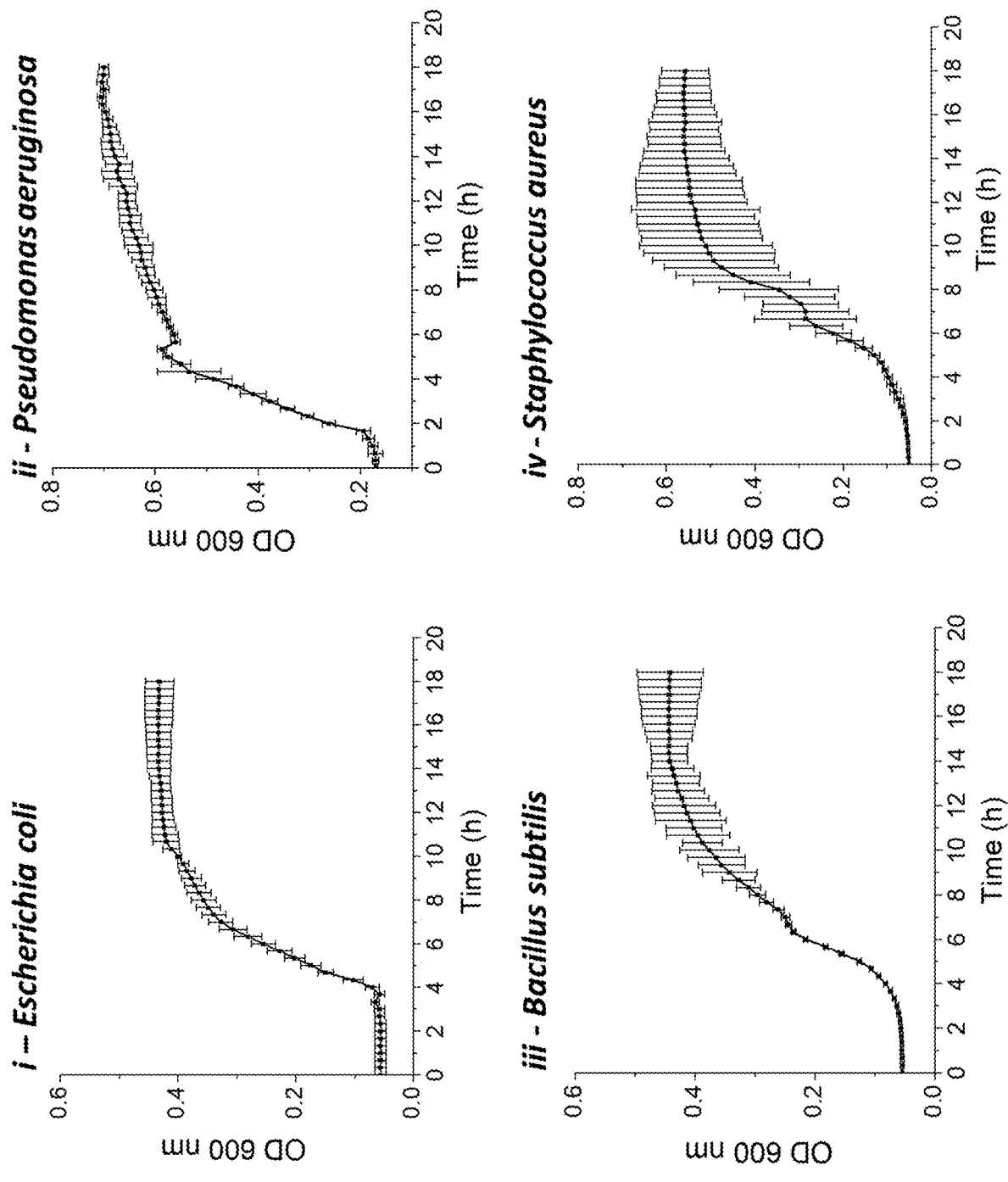
Figure 6A:
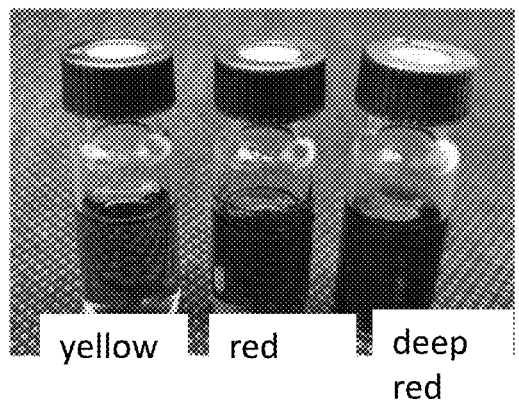
Figure 6B:
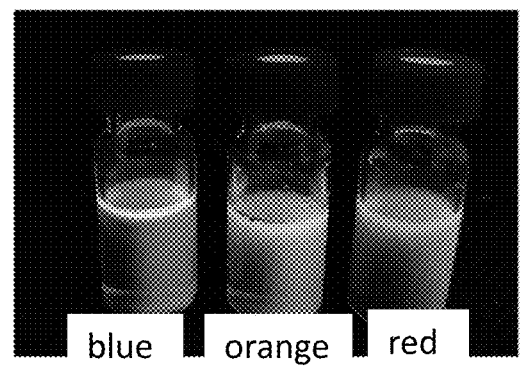
Figure 6C:
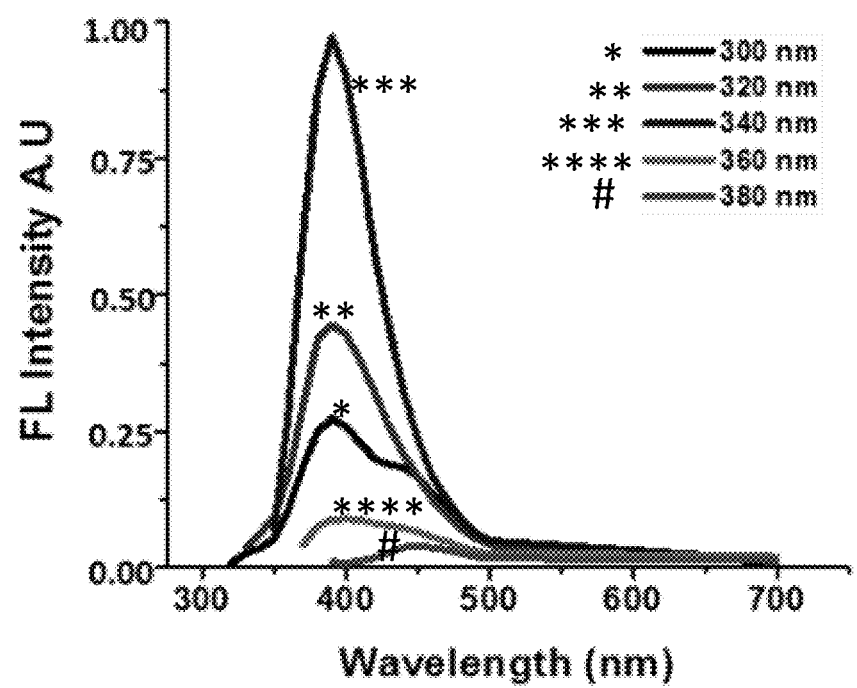
Figure 6D:
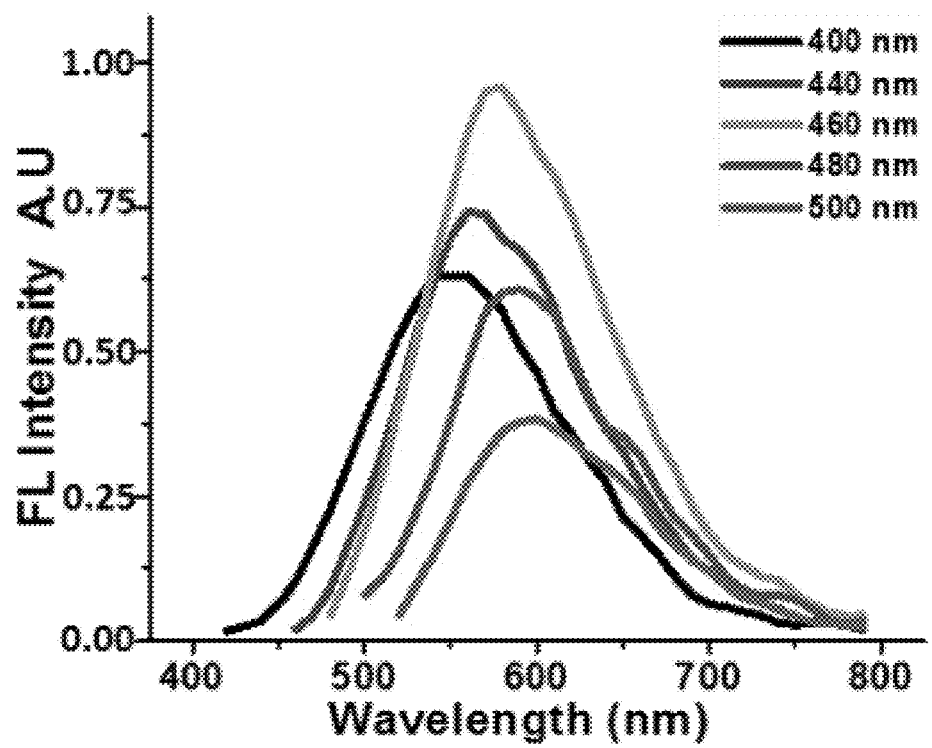
Figure 6E:
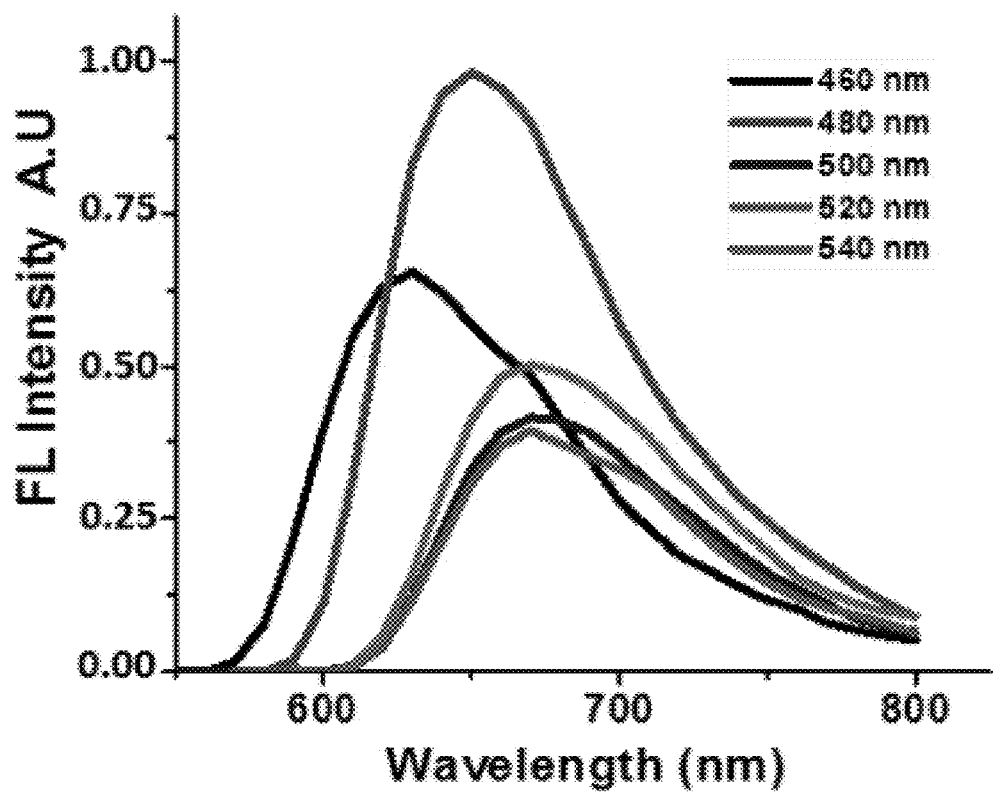

The capacitive response data obtained for the bacteria using the C-dot-IDE artificial nose were classified according to principal component analysis (PCA) (FIG. 5D), highlighting the feasibility for distinguishing among bacterial species. In a non-limiting example, FIG. 5D depicts the score plot in the first two principal component space in which PC1 accounts for the greatest total variation (95.10%) and each point represents three independent capacitive measurements. Importantly, clustering of the experimental datapoints in the PCA plot reveals no overlap between the different bacterial species tested, demonstrating that the C-dot-IDE artificial nose readily discriminates among the bacteria. Notably, the excellent selectivity was accomplished without relying upon recognition of specific bacterial metabolites, a difficult task used in most previously reported vapor-based bacterial sensing techniques. The distinctive capacitive fingerprints observed for the bacterial species tested, obtained with just three electrodes, point to the applicability of the C-dot-IDE artificial nose for detection and growth monitoring of different bacterial strains.

To conclude, the inventors present a new capacitive artificial nose technology for real-time vapor sensing based upon IDEs coated with carbon dots exhibiting defined surface polarities and optical properties. In particular, the high surface area and changes in C-dot surface polarities furnish excellent sensitivity and selectivity. A C-dot-IDE array comprising three C-dot species (red C-dots exhibiting high polarity, orange C-dots of medium polarity, and relatively apolar blue C-dots) was employed, yielding distinct capacitance changes depending upon the C-dot polarities. In a non-limiting example, the experimental data demonstrate significant variability in vapor-induced capacitance changes, depending upon matching between the polarities of both the electrode-deposited C-dots as well as the gas molecules. In particular, application of a machine learning model which utilized the capacitive response data yielded excellent predictability both in case of individual gases and for complex gas mixtures. Impedance spectroscopy measurements illuminated the likely mechanism underlying the capacitive transformations of the C-dot-IDE sensor, pointing to substitution of C-dot-adsorbed water by the gas molecules as the primary factor affecting the capacitance changes. The C-dot-IDE capacitive artificial nose was successfully employed for continuous, real-time monitoring of bacterial proliferation. Importantly, the distinctive capacitive signals recorded allowed discrimination among different Gram-positive and Gram-negative bacteria. Overall, the new capacitive C-dot-based artificial nose can be readily implemented as a portable vapor sensor, and for continuous non-invasive monitoring and identification of bacterial growth in different applications, including medical diagnosis, food processing, environmental monitoring and others.

Virus Recognition in Vapors

The COVID-19 pandemic has created huge damage to society and brought panic around the world. As a result, the severity of the causative coronavirus, SARS-CoV-2, was deeply underestimated by society at the beginning of the COVID-19 outbreak. Based on this, the inventors conducted a test for virus detection using an exemplary sensor of the invention containing Red C-dot with high surface polarity.

Two airborne viruses have been tested: Lentivirus (LVs), and Human coronavirus HCoV-OC43.

LVs

Lentivirus is a genus of retroviruses that cause chronic and deadly diseases characterized by long incubation periods, in humans and other mammalian species.

Lentivirus Culture:

7.5×106 HEK293T cells were plated onto poly K coated 10 cm plates (Sigma) in DMEM media containing 10% FBS, pen-strep, HEPES, L-glutamine, non-essential amino acids and sodium pyruvate (all from Biological Industries). 10 μg of pHAGE2 lenti vector and 3 μg of packaging plasmids tat, rev, hgpm2 and vsvg in a 1:1:1:2 ratio were transfected using JetPrime® reagent (Polyplus) according to the company's protocol. Medium was replaced 4 hrs after the transfection with fresh complete DMEM. Fresh media was added on days 2 and 3 after transfection and collected on day 4. The media containing LVs was filtered through 0.45μ PVDF membrane and aliquoted as supernatant or transferred into ultra-centrifuge tubes (Beckman Coulter), and centrifuged for 90 minutes at 17,000 RPM 4° C. The LV's pellets were suspended, aliquoted and kept in −20° C.

HCoV-OC43

Human coronavirus is a member of the species Betacoronavirus, which infects humans and cattle. The infecting coronavirus is an enveloped, positive-sense, single-stranded RNA virus that enters its host cell by binding to the N-acetyl-9-O-acetylneuraminic acid receptor. OC43 is one of seven coronaviruses known to infect humans. It is one of the viruses responsible for the common cold and act as a simulant to the covid-19 virus.

Hcov-Oc43 Culture:

HCoV-OC43 viral genome was extracted from 500 μL of patient samples using the NucliSENS easyMAG kit (BioMerieux, Marcy-l'Étoile, France). To determine the HCoV-OC43, all samples were subjected to qRT-PCR, as previously described, HCT8 cells were cultured with HCoV-OC43 in complete RPMI media containing 10% FBS, penstrep, HEPES, L-glutamine, non-essential amino acids and sodium pyruvate (all from Biological Industries, Beit Haemek, Israel) in a humidified 5% CO-2 370 C incubator. Following 5 days of incubation, sup was collected, and cell debris were discarded by centrifugation. Sup was aliquoted to 0.5 ml low bind tubes and kept in −80 C. Stock was tested on HCT8 cells.

FIG. 10 present the experimental setup (FIG. 10A) comprising aerosolized viruses generated by a pressurized airflow pipe connected to a jet-nebulizer containing diluted virus solutions. All electrodes were drop cast with 10 μl solution containing 2 mg/ml C-dots (polar C-dots, as described herein). After addition the samples were left to dry overnight. Initial capacitance values were taken for each electrode. Aerosol system was loaded with 10 ml solution. Aerosol vapors were generated for 2 min using Air flow of 10 L/min. The final capacitive values were recorded after 2 h drying at room temp. As an important control, the capacitance of DMEM solution control was measured following an identical treatment.

FIG. 10B presents the capacitance ratio between the electrode after virus recognition to their initial capacitance value. DMEM control that does not contain virus shoed a clear decrease in capacitance value compared to both virus's recognition that reveal mostly an increase in capacitance after recognition.

Additionally, one electrode from each group were tested for 5 min and 10 min aerosol exposure, (FIG. 10C), corelated to different virus concentration. Aerosol vapors were generating for additional 3 min and 5 min using Air flow of 10 L/min. The final capacitive values were recorded after 2 h drying at room temp. Remarkably, after 5 min an increase in the capacitance signal was obtained for air samples comprising virus particles, while the capacitance signal of the control sample remained almost unchanged.

This result confirms there is a huge potential in using C-dot-IDE electrode for the detection of viruses. More research is needed in order to optimize the approach and test different viruses.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A sensor array, wherein:
    said sensor array comprises a plurality of capacitive sensors;
    each capacitive sensor comprises a sensing element electrically connected to electrodes and comprising carbon dots;
    the plurality of capacitive sensors comprises at least a first sensor, a second sensor and a third sensor;
    the carbon dots of the first sensor, the second sensor and the third sensor independently comprise hydrophilic surface groups, each independently comprising nitrogen and oxygen atoms; wherein a nitrogen content of the carbon dots of the first sensor, the second sensor and of the third sensor is between 13 and 20 at %, between 10 and 12.9 at %, and between 1 and 9.9 at %, respectively;
    the hydrophilic surface groups of the carbon dots predetermine: (i) a different surface polarity; and (ii) a different sensitivity of the first sensor of the second sensor and of the third sensor to a volatile compound (VC).

2. The sensor array of claim 1, wherein the hydrophilic surface groups comprise any one of: an amine group, an imine group, a carbonyl group, a carboxy group, and a hydroxy group or any combination thereof.

3. The sensor array of claim 1, wherein an atomic ratio between (i) carbon content and (ii) a combined nitrogen and oxygen content of the carbon dots of the first sensor, of the second sensor, and of the third sensor is between 0.2 and 1.9, between 2 and 2.9, and between 3 and 8, respectively.

4. The sensor array of claim 1, wherein a w/w ratio between an amine group and an imine group of the carbon dots of the first sensor, the second sensor and the third sensor is between 1.5 and 3, between 0.8 and 1.4, between 0.2 and 0.8 respectively.

5. The sensor array of claim 1, wherein an oxygen content of the carbon dots of the first sensor, the second sensor and the third sensor is between 20 and 30 at %, between 10 and 20 at %, and between 1 and 9.9 at %, respectively.

6. The sensor array of claim 1, wherein a carbon content of the carbon dots of the first sensor, the second sensor and the third sensor is between 40 and 65 at %, between 66 and 79 at %, and between 80 and 95 at %, respectively.

7. The sensor array of claim 1, wherein said array is configured to detect a VC of interest derived from a microorganism.

8. The sensor array of claim 1, wherein said VC comprises a polar VC, a non-polar VC or both.

9. The sensor array of claim 8, wherein the first sensor is characterized by sensitivity to the polar VC, wherein the polar VC comprising amine, hydroxy, carboxy, carbonyl or any combination thereof.

10. The sensor array of claim 8, wherein the third sensor is characterized by sensitivity to the non-polar VC, wherein the non-polar VC comprises an aromatic ring, an alkyl chain or both.

11. The sensor array of claim 1, wherein each of said electrodes is configured to receive electricity.

12. The sensor array of claim 1, wherein each of said carbon dots is characterized by a different water contact angle.

13. The sensor array of claim 1, wherein the different polarity of each of said carbon dots predetermines that each of said molecular sensors is capable of generating a different capacitance signal in response to a VC.

14. A method for predicting the presence of at least one microbe of interest executable by at least one processor, the method comprises the steps:
  receiving a plurality of capacitance signals generated by a plurality of capacitive sensors in response to exposure thereof to a sample, wherein the plurality of capacitive sensors comprises at least a first sensor, a second sensor and a third sensor;
  introducing the plurality of capacitance signals to machine-learning (ML) model, wherein said ML model is trained to predict a presence and a concentration of a microbe of interest within the gaseous sample based on said capacitance signals; and producing an indication of presence or of a concentration of the microbe of interest within the sample based on the prediction; wherein:
  each of the plurality of capacitive sensors comprises a sensing element electrically connected to at least two electrodes and comprises carbon dots;
  the carbon dots comprise hydrophilic surface groups, comprising nitrogen and oxygen atoms; wherein a nitrogen content of the carbon dots of the first sensor, the second sensor and of the third sensor is between 13 and 20 at %, between 10 and 12.9 at %, and between 1 and 9.9 at %, respectively;
  the plurality of capacitive sensors comprises carbon dots characterized by different polarity;
  the hydrophilic surface groups of the carbon dots predetermine: (i) a different surface polarity; and (ii) a different sensitivity of the plurality of capacitive sensors to a specific VC.

15. The method of claim 14, wherein introducing comprises extracting at least one capacitance feature from the plurality of capacitance signals, wherein said ML model is trained to predict a presence of the microbe of interest further based on the capacitance features; wherein extracting capacitance features comprises sampling the capacitance signal at predefined time intervals; and producing a capacitance feature representing a vector of the sampled capacitance signal; optionally wherein the capacitance feature is associated with a specific capacitive sensor; optionally wherein extracting capacitance features comprises calculating a maximum change in capacitance and producing a capacitance feature representing the calculated maximum capacitance.

16. The method of claim 14, wherein training the ML model comprises:
  receiving a plurality of training samples, each of said training samples comprise labels according to (i) presence, and optionally (ii) concentration of the microbe of interest within a sample, or both (i) and (ii); and using the labeled training samples as supervisory data for training the ML model to predict presence or a concentration of the microbe of interest within the sample.

17. The method of claim 14, wherein the plurality of capacitive sensors is in a form of a sensor array; wherein said sample is a gaseous sample suspected of comprising a VC of interest; wherein said sample is obtained from an indoor location or an outdoor location, wherein the capacitance signals are generated in response to the VC of interest.

18. The method of claim 17, wherein the sensor array is in operable communication with a computing device comprising at least one hardware processor; wherein the computing device comprises a non-transitory computer-readable storage medium having stored thereon program instructions executable by the at least one hardware processor.

* * * * *